US012706920B2

(12) United States Patent
Covaci et al.

(10) Patent No.: US 12,706,920 B2
(45) Date of Patent: Aug. 11, 2026

(54) SYSTEM FOR RECORDING VERIFICATION KEYS ON A BLOCKCHAIN

(71) Applicant: nChain Licensing AG, Zug (CH)

(72) Inventors: Alexandra Covaci, Canterbury (GB); Simone Madeo, London (GB); Patrick Motylinski, London (GB); Stephane Vincent, Luxembourg (LU)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 16/762,461

(22) PCT Filed: Oct. 29, 2018

(86) PCT No.: PCT/IB2018/058434
§ 371 (c)(1),
(2) Date: May 7, 2020

(87) PCT Pub. No.: WO2019/092544
PCT Pub. Date: May 16, 2019

(65) Prior Publication Data

US 2021/0377041 A1 Dec. 2, 2021

(30) Foreign Application Priority Data

Nov. 9, 2017 (GB) ..................................... 1718505
Nov. 30, 2017 (GB) ..................................... 1719998
(Continued)

(51) Int. Cl.
*H04L 9/40* (2022.01)
*G06F 8/41* (2018.01)
(Continued)

(52) U.S. Cl.
CPC ................ *H04L 63/12* (2013.01); *G06F 8/44* (2013.01); *G06F 8/447* (2013.01); *G06F 8/451* (2013.01);
(Continued)

(58) Field of Classification Search
None
See application file for complete search history.

(56) References Cited

U.S. PATENT DOCUMENTS 4,667,290 A 5/1987 Goss et al.
5,297,150 A 3/1994 Clark
(Continued)

FOREIGN PATENT DOCUMENTS

CN 104580240 A 4/2015
CN 106506146 A 3/2017
(Continued)

OTHER PUBLICATIONS

Parno et al. "Pinocchio: Nearly Practical Verifiable Computation" [online] IACR, May 2013 [retrieved Feb. 10, 2022]. Retrieved from the Internet: URL: https://eprint.iacr.org/2013/279.pdf (Year: 2013).*
(Continued)

*Primary Examiner* — Taghi T Arani
*Assistant Examiner* — Joshua Raymond White
(74) *Attorney, Agent, or Firm* — Tarolli, Sundheim, Covell & Tummino LLP

(57) ABSTRACT

Systems and methods described herein relate to the execution of locking transactions in a blockchain system. In the context of smart contracts, it may be advantageous to have a public record (e.g., recorded on a blockchain) of a proof of correct execution of a circuit published by a worker and the verification key, thereby allowing anyone (e.g., nodes of the blockchain) to verify validity of the computation and proof. However, there are challenges to recording large blocks of
(Continued)

data (e.g., large keys that may comprise multiple elliptic curve points) on the blockchain. For example, in a Bitcoin-based blockchain network, a protocol that utilizes standard transactions may be constrained to locking scripts and unlocking scripts that are collectively no t larger than a first predetermined size limit, and the size of a redeem script (if utilized) may be limited to being no more than a second predetermined size limit.

15 Claims, 8 Drawing Sheets

(30) Foreign Application Priority Data

| | | | |
|---|---|---|---|
| Dec. 13, 2017 | (GB) | ..................................... | 1720768 |
| Feb. 2, 2018 | (GB) | ..................................... | 1801753 |
| Apr. 10, 2018 | (GB) | ..................................... | 1805948 |
| Apr. 20, 2018 | (GB) | ..................................... | 1806444 |

(51) Int. Cl.

| | |
|---|---|
| ***G06F 9/445*** | (2018.01) |
| ***G06F 16/27*** | (2019.01) |
| ***G06Q 20/06*** | (2012.01) |
| ***G06Q 20/40*** | (2012.01) |
| ***H04L 9/00*** | (2022.01) |
| ***H04L 9/06*** | (2006.01) |
| ***H04L 9/30*** | (2006.01) |
| ***H04L 9/32*** | (2006.01) |

(52) U.S. Cl.

CPC .......... *G06F 9/44521* (2013.01); *G06F 16/27* (2019.01); *G06Q 20/065* (2013.01); *G06Q 20/401* (2013.01); *G06Q 20/405* (2013.01); *H04L 9/0637* (2013.01); *H04L 9/0643* (2013.01); *H04L 9/30* (2013.01); *H04L 9/3218* (2013.01); *H04L 9/3236* (2013.01); *H04L 9/3239* (2013.01); *H04L 9/3247* (2013.01); *H04L 9/3263* (2013.01); *H04L 9/50* (2022.05); *H04L 9/0618* (2013.01); *H04L 9/3066* (2013.01); *H04L 2209/34* (2013.01); *H04L 2209/56* (2013.01)

(56) References Cited

U.S. PATENT DOCUMENTS

| | | | |
|---|---|---|---|
| 5,404,531 | A | 4/1995 | Wakatani |
| 5,499,191 | A | 3/1996 | Young |
| 5,920,830 | A | 7/1999 | Hatfield et al. |
| 6,064,928 | A | 5/2000 | Wilson et al. |
| 6,161,180 | A | 12/2000 | Matyas et al. |
| 6,519,754 | B1 | 2/2003 | McElvain et al. |
| 7,085,701 | B2 | 8/2006 | Rich et al. |
| 7,209,555 | B2 | 4/2007 | Futa et al. |
| 7,281,017 | B2 | 10/2007 | Hostetter et al. |
| 7,590,236 | B1 | 9/2009 | Boneh et al. |
| 7,796,751 | B2 | 9/2010 | Gentry |
| 8,165,287 | B2 | 4/2012 | Ghouti et al. |
| 8,189,771 | B2 | 5/2012 | Ghouti et al. |
| 8,331,556 | B2 | 12/2012 | Billet et al. |
| 8,607,129 | B2 | 12/2013 | Radhakrishnan et al. |
| 8,824,670 | B2 | 9/2014 | Icart et al. |
| 8,904,181 | B1 | 12/2014 | Felsher et al. |
| 9,026,978 | B1 | 5/2015 | Liu et al. |
| 9,286,602 | B2 | 3/2016 | Rosati et al. |
| 9,483,596 | B1 | 11/2016 | Badar et al. |
| 9,569,771 | B2 | 2/2017 | Lesavich et al. |
| 10,135,607 | B1 | 11/2018 | Roets |
| 10,339,523 | B2 | 7/2019 | McDonough et al. |
| 10,419,209 | B1 | 9/2019 | Griffin et al. |
| 10,515,567 | B2 | 12/2019 | Lablans |
| 11,226,799 | B1 | 1/2022 | Sundaresan et al. |
| 2003/0125917 | A1 | 7/2003 | Rich et al. |
| 2004/0015739 | A1 | 1/2004 | Heinkel et al. |
| 2005/0004899 | A1 | 1/2005 | Baldwin et al. |
| 2005/0139657 | A1 | 6/2005 | Hopkins |
| 2005/0262353 | A1 | 11/2005 | Gentry et al. |
| 2006/0149962 | A1 | 7/2006 | Fountain et al. |
| 2007/0061487 | A1 | 3/2007 | Moore et al. |
| 2007/0157132 | A1 | 7/2007 | Cheng et al. |
| 2008/0127067 | A1 | 5/2008 | Aubertine et al. |
| 2010/0067686 | A1 | 3/2010 | Minematsu |
| 2010/0131933 | A1 | 5/2010 | Kim et al. |
| 2010/0272209 | A1 | 10/2010 | Lee et al. |
| 2011/0024678 | A1 | 2/2011 | Schmitt |
| 2011/0200188 | A1 | 8/2011 | Ghouti et al. |
| 2012/0284175 | A1 | 11/2012 | Wilson et al. |
| 2013/0031446 | A1 | 1/2013 | Kamiya |
| 2013/0097420 | A1 | 4/2013 | Zaverucha |
| 2013/0232344 | A1 | 9/2013 | Johnson et al. |
| 2014/0250296 | A1 | 9/2014 | Hansen |
| 2014/0321644 | A1 | 10/2014 | Lemieux |
| 2014/0337234 | A1 | 11/2014 | Tang et al. |
| 2015/0363598 | A1 | 12/2015 | Xu et al. |
| 2015/0379510 | A1 | 12/2015 | Smith |
| 2016/0004820 | A1 | 1/2016 | Moore |
| 2016/0087802 | A1 | 3/2016 | Peeters |
| 2016/0140340 | A1 | 5/2016 | Walters et al. |
| 2016/0162897 | A1 | 6/2016 | Feeney |
| 2016/0204938 | A1 | 7/2016 | Kounavis et al. |
| 2016/0283941 | A1 | 9/2016 | Andrade |
| 2016/0357948 | A1 | 12/2016 | Takeuchi |
| 2017/0039330 | A1 | 2/2017 | Tanner, Jr. et al. |
| 2017/0048209 | A1 | 2/2017 | Lohe et al. |
| 2017/0085545 | A1 | 3/2017 | Lohe et al. |
| 2017/0091750 | A1 | 3/2017 | Maim |
| 2017/0091756 | A1 | 3/2017 | Stern et al. |
| 2017/0131983 | A1 | 5/2017 | Roytman et al. |
| 2017/0132421 | A1 | 5/2017 | Unitt |
| 2017/0132619 | A1 | 5/2017 | Miller et al. |
| 2017/0140408 | A1 | 5/2017 | Wuehler |
| 2017/0142103 | A1 | 5/2017 | Bringer et al. |
| 2017/0155515 | A1 | 6/2017 | Androulaki et al. |
| 2017/0177312 | A1 | 6/2017 | Boehm et al. |
| 2017/0178263 | A1 | 6/2017 | Kraemer et al. |
| 2017/0180341 | A1 | 6/2017 | Walker et al. |
| 2017/0220815 | A1 | 8/2017 | Ansari et al. |
| 2017/0221052 | A1 | 8/2017 | Sheng et al. |
| 2017/0249716 | A1 | 8/2017 | Meixner et al. |
| 2017/0250815 | A1 | 8/2017 | Cuende et al. |
| 2017/0277909 | A1 | 9/2017 | Kraemer et al. |
| 2017/0278100 | A1 | 9/2017 | Kraemer et al. |
| 2017/0279611 | A1 | 9/2017 | Kraemer et al. |
| 2017/0286079 | A1 | 10/2017 | Cho et al. |
| 2017/0286717 | A1 | 10/2017 | Khi et al. |
| 2017/0287090 | A1 | 10/2017 | Hunn et al. |
| 2017/0317833 | A1 | 11/2017 | Smith et al. |
| 2017/0317834 | A1 | 11/2017 | Smith et al. |
| 2017/0337319 | A1 | 11/2017 | Camus et al. |
| 2017/0338947 | A1 | 11/2017 | Ateniese et al. |
| 2017/0344988 | A1 | 11/2017 | Cusden et al. |
| 2017/0352209 | A1 | 12/2017 | Keuffer et al. |
| 2017/0353309 | A1 | 12/2017 | Gray |
| 2018/0034634 | A1 | 2/2018 | Benarroch Guenun et al. |
| 2018/0039667 | A1 | 2/2018 | Pierce et al. |
| 2018/0049043 | A1 | 2/2018 | Hoffberg |
| 2018/0075453 | A1 | 3/2018 | Durvasula et al. |
| 2018/0089758 | A1 | 3/2018 | Stradling et al. |
| 2018/0167201 | A1 | 6/2018 | Naqvi |
| 2018/0204005 | A1 | 7/2018 | Gajek et al. |
| 2018/0270065 | A1 | 9/2018 | Brown et al. |
| 2018/0349631 | A1 | 12/2018 | Illendula et al. |
| 2019/0095631 | A1 | 3/2019 | Roets et al. |
| 2019/0138753 | A1 | 5/2019 | Wallrabenstein |
| 2019/0163887 | A1 | 5/2019 | Frederick et al. |
| 2019/0180276 | A1 | 6/2019 | Lee et al. |
| 2019/0182035 | A1 | 6/2019 | Chari et al. |
| 2019/0295182 | A1 | 9/2019 | Kfir et al. |
| 2020/0050780 | A1 | 2/2020 | Uhr et al. |

(56) References Cited

U.S. PATENT DOCUMENTS

| | | | |
|---|---|---|---|
| 2020/0184557 | A1 | 6/2020 | Wang |
| 2020/0327498 | A1 | 10/2020 | Weber et al. |
| 2021/0019746 | A1 | 1/2021 | Adjaz et al. |
| 2021/0073795 | A1 | 3/2021 | Ruiz et al. |
| 2021/0342490 | A1 | 11/2021 | Briancon et al. |
| 2023/0269070 | A1 | 8/2023 | Covaci et al. |
| 2024/0143739 | A1 | 5/2024 | Cao et al. |

FOREIGN PATENT DOCUMENTS

| | | | |
|---|---|---|---|
| CN | 106534317 | A | 3/2017 |
| CN | 107040545 | A | 8/2017 |
| CN | 107179932 | A | 9/2017 |
| CN | 107274184 | A | 10/2017 |
| CN | 107426234 | A | 12/2017 |
| EP | 3249599 | A1 | 11/2017 |
| JP | H08305547 | A | 11/1996 |
| JP | 2006505055 | A | 2/2006 |
| JP | 2009541853 | A | 11/2009 |
| JP | 2011119952 | A | 6/2011 |
| JP | 5697153 | B2 | 4/2015 |
| JP | 2015132754 | A | 7/2015 |
| JP | 7208989 | B2 | 1/2023 |
| JP | 7221954 | B2 | 2/2023 |
| JP | 7285840 | B2 | 6/2023 |
| KR | 101795696 | B1 | 11/2017 |
| KR | 20200096790 | A | 8/2020 |
| WO | 2016131577 | A1 | 8/2016 |
| WO | 2016155804 | A1 | 10/2016 |
| WO | 2016206567 | A1 | 12/2016 |
| WO | 2017008829 | A1 | 1/2017 |
| WO | 2017032541 | A1 | 3/2017 |
| WO | 2017079652 | A1 | 5/2017 |
| WO | 2017104149 | A1 | 6/2017 |
| WO | 2017/145009 | A1 | 8/2017 |
| WO | 2017/145019 | A1 | 8/2017 |
| WO | 2017/145020 | A1 | 8/2017 |
| WO | 2017145010 | A1 | 8/2017 |
| WO | 2017148527 | A1 | 9/2017 |
| WO | 2017178956 | A1 | 10/2017 |
| WO | 2017187396 | A1 | 11/2017 |
| WO | 2017187398 | A1 | 11/2017 |
| WO | 2017187399 | A1 | 11/2017 |
| WO | 2017190795 | A1 | 11/2017 |
| WO | 2018127446 | A1 | 7/2018 |
| WO | 2018127456 | A2 | 7/2018 |

OTHER PUBLICATIONS

Sward, Andrew et al. "Data Insertion in Bitcoin's Blockchain" [online] Augustana College, Jul. 2017 [retrieved Feb. 10, 2022]. Retrieved from the Internet: URL: https://digitalcommons.augustana.edu/cgi/viewcontent.cgi?article=1000&context=cscfaculty (Year: 2017).*

Ben-Sasson, Eli et al. "Succinct Non-Interactive Zero Knowledge for a von Neumann Architecture" [online] Tel Aviv University, Dec. 30, 2013 [retrieved Feb. 10, 2022]. Retrieved from the Internet: URL: http://cs.tau.ac.il/~tromer/papers/vnsnark-20131230.pdf (Year: 2013).*

Ben-Sasson, Eli et al. "Scalable Zero Knowledge via Cycles of Elliptic Curves" [online] IACR, Sep. 18, 2016 [retrieved Feb. 10, 2022]. Retrieved from the Internet: URL: https://eprint.iacr.org/2014/595.pdf (Year: 2016).*

Virza, Madars "On Deploying Succinct Zero-Knowledge Proofs" [online] MIT, Sep. 2017 [retrieved Feb. 10, 2022]. Retrieved from the Internet: URL: On Deploying Succinct Zero-Knowledge Proofs (Year: 2017).*

Parno, Bryan et al. "Pinocchio: Nearly Practical Verifiable Computation" [online] IACR, May 2013 [retrieved Feb. 10, 2022]. Retrieved from the Internet: URL: https://eprint.iacr.org/2013/279.pdf (Year: 2013).*

Paganini, Pierluigi "What is a digital signature? Fundamental principles" [online] Security Affairs, May 2012 [retrieved Apr. 28, 2023]. Retrieved from the Internet: URL: https://securityaffairs.com/5223/digital-id/what-is-a-digital-signature-fundamental-principles.html (Year: 2012).*

Turner, "CSE 260. Introduction to Digital Logic and Computer Design," Syllabus and Text Book, https://www.arl.wustl.edu/-jst/cse/260/ddc.pdf, 2015, 435 pages.

Mayer, "zk-SNARK Explained: Basic Principles," Dec. 13, 2016, 9 pages.

Mayer, "zk-SNARK explained: Basic Principles," retrieved from https://www.researchgate.net/publication/321124635_zk-SNARK_explained_Basic_Principles, Dec. 2016, 9 pages.

Müller, "A Short Note on Secret Sharing Using Elliptic Curves," Proceedings of SECRYPT 2008, Jul. 26, 2008, http://www.scitepress.org/Papers/2008/19183/19183.pdf, 4 pages.

Nakamoto, "Bitcoin: A Peer-to-Peer Electronic Cash System," Bitcoin, Oct. 31, 2008, https://bitcoin.org/bitcoin.pdf, 9 pages.

Ning, "Automatically Convert MATLAB Code to C Code, " https://www.mathworks.com/videos/automatically-converting-matlab-code-to-c-code-96483.html, Aug. 19, 2014, 8 pages.

Parno, "A Note on the Unsoundness of vnTinyRAM's SNARK," retrieved from https://eprint.iacr.org/2015/437, May 6, 2015, 4 pages.

Prasad et al., "Effect pf Quine-Mccluskey Simplification on Boolean Space Complexity," IEEE Xplore, Jul. 25-26, 2009, 6 pages.

Ritzdorf et al., "TLS-N: Non-repudiation over TLS Enabling Ubiquitous Content Signing for Disintermediation," IACR ePrint report, first disclosed 2017 [retrieved May 2, 2018], 16 pages.

Satoshi et al., "Connection Limits," Bitcoin Forum, Aug. 9, 2010, https://bitcointalk.org/index.php?topic=741.0;prev_next=prev, 2 pages.

Schaeffer et al., "ZoKrates—a Toolbox for zkSNARKS on Ethereum," https://github.com/Zokrates/ZoKrates, Feb. 4, 2019, 3 pages.

Schoenmakers et al., "Trinocchio: Privacy-Preserving Outsourcing by Distributed Verifiable Computation," International Conference on Applied Cryptography and Network Security, Jun. 19, 2016, https://eprint.iacr.org/2015/480.pdf, 33 pages.

Stuart, "EECS Presents Awards for Outstanding PhD and SM Theses," EECS, Nov. 8, 2017, 2 pages.

Teutsch et al., "A scalable verification solution for blockchains," Nov. 16, 2017, https://people.cs.uchicago.edu/~teutsch/papers/truebit.pdf, 50 pages.

Tillich et al., "Circuits of basic functions suitable for MPC and FHE," https://homes.esat.kuleuven.be/~nsmart/MPC/, first disclosed 2012, retrieved May 2, 2018, 2 pages.

Turner, "Designing Digital Circuits a modern approach," CSE 260, Introduction to Digital Logic and Computer Design, Spring 2014, 435 pages.

UK Commercial Search Report mailed Dec. 3, 2018, Patent Application No. GB1806444.4, 8 pages.

UK Commercial Search Report mailed Feb. 2, 2018, Patent Application No. GB1718505.9, 7 pages.

UK Commercial Search Report mailed May 31, 2018, Patent Application No. GB1801753.3, 8 pages.

UK Commercial Search Report mailed Oct. 25, 2018, Patent Application No. GB1805948.5 , 9 pages.

UK IPO Search Report mailed Jul. 26, 2018, Patent Application No. GB1801753.3, 5 pages.

UK IPO Search Report mailed Nov. 2, 2018, Patent Application No. GB1805948.5, 4 pages.

UK IPO Search Report mailed Nov. 8, 2018, Patent Application No. GB1806444.4, 6 pages.

United Kingdom Commercial Search Report mailed Apr. 20, 2018, Patent Application No. 1720768.9, filed Dec. 13, 2017, 8 pages.

United Kingdom Intellectual Property Office Search Report mailed Jun. 12, 2018, Patent Application No. 1720768.9, filed Dec. 13, 2017, 7 pages.

United Kingdom Intellectual Property Office Search Report mailed May 3, 2018, Patent Application No. 1719998.5, filed Nov. 30, 2017, 6 pages.

United Kingdom IPO Search Report mailed Apr. 27, 2018, Patent Application No. 1718505.9, filed Nov. 9, 2017, 5 pages.

(56) References Cited

OTHER PUBLICATIONS

Wikipedia, "Precompiled Header," Retrieved Mar. 30, 2022, https://en.wikipedia.org/w/index.php?title=Precompiled_header&oldid=807155683, 3 pages.
Wikipedia, "Zero Knowledge Contingent Payment," Bitcoin Wiki, retrieved from https://en.bitcoin.it/wiki/Zero_Knowledge_Contingent_Payment, Apr. 8, 2020, 3 pages.
Wu et al., "Libsnark: a C++ Library for zkSNARK Proofs," SCIPR Lab, libsnark/README.md at 92a80f74727091fdc40e6021dc42e9f6b67d5176, Aug. 18, 2017, 9 pages.
ZCASH, "zk-SNARKs," zCash website, retreived Apr. 1, 2022 from https://web.archive.org/web/20171107012237/ https://z.cash/technology/zksnarks.html, Nov. 24, 2017, 1 page.
Antonopoulos, "Mastering Bitcoin—Unlocking Digital Cryptocurrencies," O'Reilly Media, Inc., Dec. 20, 2014, 282 pages.
Ben-Sasson et al., "Zerocash: Decentralized Anonymous Payments from Bitcoin," 2014 IEEE Symposium on Security and Privacy, May 18, 2014, http://zerocash-project.org/media/pdf/zerocash-oakland2014.pdf, 16 pages.
Bitcoinstrings, "Blockchain in Words," retrieved from https://bitcoinstrings.com/blk00281.txt, Dec. 2013, 667 pages.
Bowe, "Pay-to-Sudoku," GitHub, retrieved from https://github.com/zcash-hackworks/pay-to-sudoku/blob/master/README.md, 2016, 2 pages.
Brown et al., "Transport layer security (tls) evidence extensions," Working Draft, IETF Secretariat, Internet-Draft drafthousley-evidence-extns-01, https://tools.ietf.org/pdf/draft-housley-evidence-extns-01, Nov. 2006 [retrieved May 2, 2018], 21 pages.
Buterin, "Quadratic Arithmetric Programs: from Zero to Hero," retrieved from https://medium.com/@VitalikButerin/quadratic-arithmetic-programs-from-zero-to-hero-f6d558cea649, Dec. 11, 2016, 9 pages.
Campanelli et al., "Zero-knowledge contingent payments revisited: Attacks and payments for services," Proceedings of the 2017 ACM SIGSAC Conference on Computer and Communications Security, Oct. 30, 2017, 28 pages.
Canetti et al., "Practical Delegation of Computation Using Multiple Servers," CCS, Oct. 17, 2011, 10 pages.
Castor, "Trust Your Oracle? Cornell Launches Tool for Confidential Blockchain Queries," CoinDesk, retrieved from https://www.coindesk.com/tech/2017/05/17/trust-your-oracle-cornell-launches-tool-for-confidential-blockchain-queries/, May 17, 2017, 5 pages.
Commercial Search Report mailed Feb. 28, 2018, United Kingdom Patent Application No. 1719998.5, filed Nov. 30, 2017, 6 pages.
Costello et al., "Geppetto: versatile Verifiable Computation," 2015 IEEE Symposium on Security and Privacy, 2015, 22 pages.
Covaci et al., "NECTAR: Non-Interactive Smart Contract Protocol using Blockchain Technology," arXiv preprint arXiv:1803.04860, Mar. 13, 2018, 8 pages.
Davidsen et al., "Empowering the Economy of Things," 2017, 54 pages.
Eberhardt et al., "ZoKrates—Scalable Privacy-Preserving Off-Chain Computations," Information Systems Engineering (ISE), Aug. 2018, 8 pages.
Ethereum Foundation, "ZoKrates—A Toolbox for zkSNARKS on Ethereum," https://www.youtube.com/watch?v=sSlrywb5J_0, Nov. 26, 2017, 12 pages.
Fee et al., "Cryptography using Chebyshev polynomials," Maple Summer Workshop, Burnaby, Canada, Jul. 11, 2004, http://www.cecm.sfu.ca/CAG/ppaers/CHEB, 16 pages.
Fiore et al., Hash First, Argue Later Adaptive Verifiable Computations on Outsourced Data, ACM Computer and Communications Security, 2016, 40 pages.
Fournet et al., "A Certified Compiler for Verifiable Computing," HAL Open Science, Jun. 2016, 14 pages.
Franz et al., "CBMC-GC: An ANSI C Compiler for Secure Two-Party Computations," retrieved from https://arise.or.at/pubpdf/CBMC-GC_An_ANSI_C_Compiler_for_Secure_Two-Party_Computations.pdf, 2014, 5 pages.
Fuchsbauer et al., "Proofs on Encrypted Values in Bilinear Groups and an Applicaiton to Anonymity of Signatures," Third International Conference on Pairing-based Cryptography, Aug. 2009, 26 pages.
Gennaro et al., "Quadratic Span Programs and Succint NIZKs without PCPs," Annual International Conference on the Theory and Applications of Cryptographic Techniques, May 26, 2013, 20 pages.
Gennaro et al., "Robust Threshold DSS Signatures," International Conference on the Theory and Applications of Cryptographic Techniques, May 12, 1996, https://link.springer.com/content/pdf/10.1007%2F3-540-68339-9_31.pdf, 18 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
Hajjeh et al., "TLS Sign," TLS Working Group, Internet Draft Version 4, Dec. 15, 2007 [retrieved May 2, 2018], https://tools.ietf.org/html/draft-hajjeh-tls-sign-04, 12 pages.
Hearn, "Continuing the zkSNARK Tutorials," retrieved from https://blog.plan99.net/vntinyram-7b9d5b299097, Dec. 15, 2016, 9 pages.
Hong et al., "Verifiable Computation of Large Polynomials," retrieved from http://or.nsfc.gov.cn/bitstream/00001903-5/154735/1/1000009080185.pdf, Dec. 16, 2014, 13 pages.
International Search Report and Written Opinion mailed Jan. 15, 2019, Patent Application No. PCT/IB2018/058434, 11 pages.
International Search Report and Written Opinion mailed Jan. 17, 2019, Patent Application No. PCT/IB2018/058432, 11 pages.
International Search Report and Written Opinion mailed Jan. 17, 2019, Patent Application No. PCT/IB2018/058437, 10 pages.
International Search Report and Written Opinion mailed Jan. 22, 2019, Patent Application No. PCT/IB2018/058583, 10 pages.
International Search Report and Written Opinion mailed Jan. 23, 2019, Patent Application No. PCT/IB2018/058433, 12 pages.
International Search Report and Written Opinion mailed Jan. 23, 2019, Patent Application No. PCT/IB2018/058491, 12 pages.
International Search Report and Written Opinion mailed Mar. 14, 2019, Patent Application No. PCT/IB2018/059770, 12 pages.
International Search Report and Written Opinion mailed Mar. 19, 2019, Patent Application No. PCT/IB2018/059918, 14 pages.
Jehan, "Rockchain Decentralized Audited Data Networks, " White Paper, retrieved from https://www.rockchain.org/RockchainWhitePaper.pdf, Jan. 20, 2018, 28 pages.
Keutzer et al., "Anatomy of a Hardware Compiler," 1988, 10 pages.
Kiayias et al., "Proofs of Proofs of Work with Sublinear Complexity," Financial Cryptography and Data Security, 2016, 18 pages.
Kosba et al., "Hawk: The Blockchain Model of Cryptography and Privacy-Preserving Smart Contracts," IEEE Symposium on Security and Privacy, May 22, 2016, 31 pages.
Kreuter, "Techniques for Scalable Secure Computation Systems," retrieved from https://repository.library.northeastern.edu/files/neu:cj82rh04k/fulltext.pdf, May 2018, 145 pages.
Król et al., "SPOC: Secure Payments for Outsourced Computations," Jul. 17, 2018, 6 pages.
Kumaresan et al., "How to Use Bitcoin to Incentivize Correct Computations," retrieved from https://people.csail.mit.edu/ranjit/papers/incentives.pdf, Nov. 2014, 12 pages.
Kuzminov et al., "Bridging the Gaps with lolite Blockchain," Iolite Foundation White Paper, 2017, 13 pages.
Malkhi et al., "Fairplay—A Secure Two-Party Computation System," Aug. 2004, 17 pages.
Mathworks, "Matlab Coder—Generate C and C++ Code From MATLAB Code," 9 pages.
Maxwell, "The First Successful Zero-Knowledge Contingent Payment," Bitcoin Core, retrieved from https://bitcoincore.org/en/2016/02/26/zero-knowledge-contingent-payments-announcement/, Feb. 26, 2016, 5 pages.
Ben-Sasson et al., "SNARKs for C: Verifying program executions succinctly and in zero knowledge," Advances in Cryptology-CRYPTO 2013, Aug. 18, 2013, 19 pages.
Kerber, "Verifiable Computation in Smart Contracts," University of Edinburgh School of Informatics Computer Science 4th Year Project Report, published online Apr. 4, 2017 [retrieved May 2, 2018], https://git.drwx.org/bsc/proj-report/raw/branch/master/report.pdf, 49 pages.

(56) References Cited

OTHER PUBLICATIONS

Maxwell et al., "Chat logs," Bitcoin-wizards IRC Chat Channel, Aug. 16, 2013 [retrieved May 2, 2018], https://download.wpsoftware.net/bitcoin/wizards/2013/08/13-08-16.log, 1 page.
Maxwell et al., "CoinCovenants using SCIP signatures, an amusingly bad idea," Bitcoin Forum, Aug. 20, 2013 [retrieved Apr. 13, 2018], https://bitcointalk.org/index.php?topic=278122.0, 5 pages.
Maxwell et al., "Really Really ultimate blockchain compression: CoinWitness," Bitcoin Forum, Aug. 19, 2013 [retrieved Apr. 11, 2018], https://bitcointalk.org/index.php?topic=277389.0, 7 pages.
Todd, "[bitcoin-dev] Building Blocks of the State Machine Approach to Consensus," petertodd.org, Jun. 20, 2016, https://lists.linuxfoundation.org/pipermail/bitcoin-dev/2016-June/012773.html, six pages.
Viacoin Dev Team, "Styx: Unlinkable Anonymous Atomic Payment Hub for Viacoin," viacoin.org, Oct. 14, 2016, http://docplayer.net/35213119-Styx-unlinkable-anonymous-atomic-payment-hub-for-viacoin-viacoin-dev-team-viacoin-org.html, 18 pages.
Wikipedia, "Huffman coding," Wikipedia the Free Encyclopedia, Febraury 24, 2018, https://en.wikipedia.org/w/index.php?title=Huffman_coding&oldid=827366029, 11 pages.
Bitcoin Core, "The First Successful Zero-Knowlwdge Contingent Payment", 2022, 5 pages.
Zyskind et al., "Enigma: Decentralized Computation Platform with Guaranteed Privacy," arXiv preprint arXiv:1506, Jun. 10, 2015, 14 pages.
Chen et al., "Algebraic Geometric Secret Sharing Schemes and Secure Multi-Party Computations over Small Fields", Advances in Cryptology, 2006, 16 pages.
"How Log Proofs Work," Certificate Transparency, Sep. 25, 2017 [retrieved May 2, 2018], https://web.archive.org/web/20170925180136/http://www.certificate-transparency.org/log-proofs-work, 5 pages.
Anonymous, "Background Page," Oraclize, Oct. 2017 [retrieved May 2, 2018], https://web.archive.org/web/20171017121053/http://docs.oraclize.it/, 18 pages.
Bertani et al., "How can I trust smart contracts that use Oraclize?," Reddit, May 25, 2017 [retrieved May 2, 2018], https://www.reddit.com/r/ethereum/comments/6d7j7x/how_can_i_trust_smart_contracts_that_use_oraclize/di0nb17/, 5 pages.
Fu, "Off-Chain Computation Solutions for Ethereum Developers," Medium, Sep. 12, 2017 [retreived May 2, 2018], https://medium.com/@YondonFu/off-chain-computation-solutions-for-ethereum-developers-507b23355b17, 8 pages.
International Search Report and Written Opinion mailed Mar. 14, 2019, Patent Application No. PCT/IB2018/059920, 12 pages.
Spencertruman et al., "[Whitepaper] Witnet: A Decentralized Oracle Network Protocol," Bitcoin Forum, Dec. 11, 2017 [retreived May 2, 2018], https://bitcointalk.org/index.php?topic=2567253.0, 9 pages.
Tarr, "Merkle Tree Logs #27," https://github.com/ssbc/secure-scuttlebutt/issues/27, Sep. 17, 2014, 4 pages.
Tarr, "Tree-Exchange," Github, Aug. 4, 2014 (last updated Sep. 17, 2014) [retrieved May 10, 2018], https://github.com/dominictarr/tree-exchange, 3 pages.
UK Commercial Search Report mailed May 4, 2018, Patent Application No. GB1720946.1, 8 pages.
UK IPO Search Report mailed Jun. 15, 2018, Patent Application No. GB1720946.1, 4 pages.
Van Den Hooff et al., "VerSum: Verifiable Computations over Large Public Logs, " Proceedings of the 2014 ACM SIGSAC Conference on Computer and Communications Security, Nov. 3, 2014, 14 pages.
Zhang et al., "A Remote-Attestation-Based Extended Hash Algorithm for Privacy Protection," 2017 International Conference on Computer Network, Electronic and Automation (ICCNEA), Sep. 23, 2017, 4 pages.
Klmoney, "Part 1: Transaction Basics", Jun. 6, 2017, retrieved from the internet, https://web.archive.org/web/20170606202729/https://klmoney.wordpress.com/bitcoin-dissecting-transactions-part-1, 9 pages.
Vangie, Beal, "What is a Computer System?" Webopedia, Aug. 1, 2022, https://www.webopedia.com/definitions/computer-system, 2 pages.
Bertani, "Scalable Onchain Verification for Authenticated Data Feeds and Offchain Computations," YouTube, Ethereum Foundation, Nov. 26, 2017 [retrieved May 10, 2018], https://www.youtube.com/watch?v=7uQdEBVu8Sk, 19:19, 4 pages.
Tarr et al., "Merkle Tree Logs #27," GitHub Secure-Scuttlebutt project page, Sep. 17, 2014 [retrieved May 10, 2018], https://github.com/ssbc/secure-scuttlebutt/issues/27, 4 pages.
Paganini, Pierluigi What is a Digital Signature? Fundamental Principles, Security Affairs, May 2012, https://securityaffairs.com/5223/digital-id/what-is-a-digital-signature-fundamental principles.html, 7 pages.
Parno et al., "Pinocchio: Nearly Practical Verifiable Computation," IEEE Symposium on Security and Privacy, May 19, 2013, 16 pages.
Menezes et al., "Handbook of Applied Cryptography: pp. 33, 38," CRC Press, Oct. 16, 1996, 3 pages.
Justus, Benjamin, "Point Compression and Coordinate Recovery for Edwards Curves over Finite Field", Annals of West University of Timisoara-Mathematics and Computer Science, 2014, 15 pages.
Intellectual Property Office of Korea, "Request for the Submission of an Opinion" in Application No. 10-2020-7014213, Jan. 31, 2024, 7 pages.
Japan Patent Office "Notice of Reasons for Rejection" in Application No. 2023-014319, Feb. 13, 2024, 12 pages.
Al-Riyami, Sattam, S., "Cryptographic Schemes Based on Elliptic Curve Pairings", Technical Report, RHUL-MA-2002-2, Feb. 2, 2005, 278 pages.
Intellectual Property Office of Korea, "Request for the Submission of an Opinion" in Application No. 10-2024-7024191, Aug. 5, 2024, 4 pages.
Shocker, Ali, "Sustainable Blockchain through Proof of exercise", 2017 IEEE 16th International Symposium on Network Computing and Applications (NCA), Nov. 1, 2017, 9 pages.
Ball, M. et al., "Proof of Useful Work", Cryptology ePrint Archive, Report, Feb. 27, 2017, 31 pages.
Japanese Patent Office "Notice of Reasons for Refusal," dated Jul. 30, 2024, Application No. 2023-176820, 7 pages.
Sanchez, David Cerezo, "Raziel: Private and Verifiable Smart Contracts in Blockchains", Sep. 17, 2017, 55 pages.
Seijas et al., "Scripting Smart Contract for Distributed Ledger Technology", Feb. 10, 2017, 33 pages.
Yoshiki Higashikado, et al., A discussion on Certificate Management in Consortium Chain, 2017 Symposium on Cryptography and Information Security (SCIS2017) [USB], Japan, 2017 Symposium on Cryptography and Information Security, Jan. 24, 2017, 1F2-3 p. 1-4.

* cited by examiner

SYSTEM FOR RECORDING VERIFICATION KEYS ON A BLOCKCHAIN

FIELD OF INVENTION

This invention relates generally to computer-implemented security and/or verification techniques. It also relates to solutions for expanding or enhancing blockchain capabilities, and more particularly to implementing anonymous or near-anonymous digital transactions. The invention is particularly suited, but not limited to, use in protocols that can utilize and/or benefit from cryptographically verifiable assurances of completeness (if the protocol is followed correctly then the honest verifier will be convinced of the validity of the output), soundness (no cheating prover can convince the honest verifier that the authenticity of the output is true), and/or zero-knowledge (if the output is valid, no cheating verifier learns anything other than this fact). Various protocols as described herein may be suitable for recording verification keys on the blockchain wherein a worker is able to prove possession of the correct verification key $V_K$ (e.g., issued by the client). The invention may utilise cryptographic and mathematical techniques to enforce security in relation to electronic transfers conducted over a blockchain network.

BACKGROUND OF INVENTION

In this document the term 'blockchain' may refer to any of several types of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to as a useful application of the technology described herein for the purpose of convenience and illustration, Bitcoin is just one of many applications to which the technology described in the present disclosure may be applied. However, it should be noted that the invention is not limited to use with the Bitcoin blockchain and alternative blockchain implementations and protocols, including non-commercial applications, also fall within the scope of the present invention. For example, techniques described within the present disclosure would provide advantages to utilising other blockchain implementations that have limitations similar to Bitcoin regarding the recording of verification keys wherein an entity is able to prove possession of a correct or appropriate verification key $V_K$. It should be noted that as described herein, Bitcoin refers to any Bitcoin-based blockchain network such as Bitcoin Cash and Bitcoin Classic.

A blockchain is a peer-to-peer, electronic ledger which is implemented as a computer-based decentralised, distributed system made up of blocks which in turn may be made up of transactions and other information. In some examples, a "blockchain transaction" refers to an input message encoding a structured collection of field values comprising data and a set of conditions, where fulfilment of the set of conditions is prerequisite for the set of fields to be written to a blockchain data structure. For example, with Bitcoin each transaction is a data structure that encodes the transfer of control of a digital asset between participants in the blockchain system, and includes at least one input and at least one output. In some embodiments, a "digital asset" refers to binary data that is associated with a right to use. Examples of digital assets include Bitcoin, ether, and Litecoins. In some implementations, transferring control of a digital asset can be performed by reassociating at least a portion of a digital asset from a first entity to a second entity. Each block of the blockchain may contain a hash of the previous block so that blocks become chained together to create a permanent, unalterable record of all transactions which have been written to the blockchain since its inception.

In some examples, "stack-based scripting language" refers to a programming language that supports various stack-based or stack-oriented execution models and operations. That is, the stack-based scripting language may utilize a stack. With the stack, values can be pushed onto the top of the stack or popped from the top of the stack. Various operations performed to the stack can result in pushing or popping one or more of the values to or from the top of the stack. For example, an OP_EQUAL operation pops the top two items from the stack, compares them, and pushes a result (e.g., 1 if equal or 0 if unequal) to the top of the stack. Other operations performed to the stack, such as OP_PICK, may allow items to be selected from positions other than the top of the stack. In some scripting languages employed by some of the present embodiments, there may be at least two stacks: a main stack and an alternate stack. Some operations of the scripting language can move items from the top of one stack to the top of another stack. For example, OP_TOALTSTACK, moves a value from the top of the main stack to the top of the alternate stack. It should be noted that a stack-based scripting language, in some cases, may not be limited solely to operation in a strictly last-in-first-out (LIFO) manner. For example, a stack-based scripting language may support operations that copies or moves the n-th item in the stack to the top (e.g., OP_PICK and OP_ROLL respectively, in Bitcoin). Scripts written in a stack-based scripting language may be pushed onto a logical stack that can be implemented using any suitable data structure such as a vector, list, or stack.

In order for a transaction to be written to the blockchain, it must be "validated". Network nodes (mining nodes) perform work to ensure that each transaction is valid, with invalid transactions rejected from the network. A node can have standards for validity different from other nodes. Because validity in the blockchain is consensus based, a transaction is considered valid if a majority of nodes agree that a transaction is valid. Software clients installed on the nodes perform this validation work on transactions referencing an unspent transaction (UTXO) in part by executing the UTXO locking and unlocking scripts. If execution of the locking and unlocking scripts evaluates to TRUE and other validation conditions, if applicable, are met, the transaction is validated by the node. The validated transaction is propagated to other network nodes, whereupon a mining node can select to include the transaction in a blockchain. Thus, in order for a transaction to be written to the blockchain, it must be i) validated by the first node that receives the transaction—if the transaction is validated, the node relays it to the other nodes in the network; and ii) added to a new block built by a mining node; and iii) mined, i.e., added to the public ledger of past transactions. The transaction is considered to be confirmed when a sufficient number of blocks is added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems.

It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing etc.) while being more versatile in their applications.

The present disclosure describes technical aspects of one or more blockchain-based computer programs. A blockchain-based computer program may be a machine readable and executable program recorded in a blockchain transaction. The blockchain-based computer program may comprise rules that can process inputs in order to produce results, which can then cause actions to be performed dependent upon those results. One area of current research is the use of blockchain-based computer programs for the implementation of "smart contracts". Unlike a traditional contract which would be written in natural language, smart contracts may be computer programs designed to automate the execution of the terms of a machine-readable contract or agreement.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

In embodiments, although interaction with specific entities can be encoded at specific steps in the smart contract, the smart contract can otherwise be automatically executed and self-enforced. It is machine readable and executable. In some examples, automatic execution refers to the execution of the smart contract that is successfully performed to enable transfer of the UTXO. Note that in such examples, "an entity" that is able to cause the transfer of the UTXO refers to an entity that is able to create the unlocking script without being required to prove knowledge of some secret. In other words, the unlocking transaction can be validated without verifying that the source of the data (e.g., an entity that created the unlocking transaction) has access to a cryptographic secret (e.g., private asymmetric key, symmetric key, etc.). Also, in such examples, self-enforcement refers to the validation nodes of the blockchain network being caused to enforce the unlocking transaction according to the constraints. In some examples, "unlocking" a UTXO (also known as "spending" the UTXO) is used in the technical sense, referring to creating an unlocking transaction that references the UTXO and executes as valid.

A blockchain transaction output includes a locking script and information regarding ownership of digital assets such as Bitcoins. The locking script, which may also be referred to as an encumbrance, "locks" the digital assets by specifying conditions that are required to be met in order to transfer the UTXO. For example, a locking script could require that certain data be provided in an unlocking script to unlock the associated digital assets. The locking script is also known as "scriptPubKey" in Bitcoin. A technique for requiring a party to provide data to unlock a digital asset involves embedding a hash of the data inside the locking script. However, this presents a problem if the data is undetermined (e.g., not known and fixed) at the time the locking script is created.

The invention may be described as a verification method/system, and/or as a control method/system for controlling the validation of blockchain transactions. In some embodiments, a validated blockchain transactions results in recordation of the transaction on a blockchain, which in some applications, may result in an exchange or transfer of a digital asset via the blockchain. The digital asset may be a unit of a resource managed by a blockchain. Although the digital asset may, in some embodiments, be used as cryptocurrency, it is contemplated that the digital asset, in embodiments, is additionally or alternatively usable in other contexts. Note that the invention, while applicable to the control of digital assets, is technical in nature and can be used in other contexts that utilise blockchain data structures without necessarily involving the transfer of digital assets.

SUMMARY OF INVENTION

Thus, it is desirable to provide systems and methods arranged to enable secure transfers and exchanges over a blockchain. Preferably, this is a public blockchain but not necessarily so. It is furthermore desirable to implement anonymous digital transfers and/or communications wherein information regarding the transfer/communication is obfuscated, such as (for example) information related to the recipient of digital assets in a blockchain transaction. It is furthermore desirable to provide credential authorities for reading/writing metadata on the blockchain such that, in accordance with a protocol, metadata cannot be read and/or modified unless appropriate credentials are presented. Thus, the invention provides enhanced verification and/or security.

Such an improved solution has now been devised.

Thus, in accordance with the present invention there are provided systems and methods as defined in the appended claims.

The invention may be described as a security method/system. Additionally or alternatively, it may be described as a verification method/system. The invention may provide benefits relating to (but not limited to) cryptographically verifiable assurances of completeness, soundness and/or zero-knowledge. Additionally or alternatively, the invention may enable or at least facilitate recording of verification keys on the blockchain wherein an entity is able to prove possession of a correct or appropriate verification key $V_K$. Additionally or alternatively, the invention can be described as providing a control mechanism for controlling the performance of distributed computation, giving rise to enhanced efficiency and security.

In accordance with the invention there may be provided a computer-implemented method comprising: obtaining a redeem script associated with a blockchain transaction, the first script comprising a first set of commands and one or more cryptographic hash values; generating a second script comprising a second set of commands, one or more subsets of a plurality of elements, wherein the plurality of elements collectively form a verification key and the one or more subsets collectively include each element of the verification key, the first script, and an identifier associated with a computer system generating the second script; and generating an attestation that the computer system has access to the verification key based at least in part on executing the first set of commands and the second set of commands in connection to determine that the one or more cryptographic hash values match the one or more subsets of the verification key.

The elements of the plurality of elements may be points on an elliptic curve.

The first set of commands and the second set of commands may collectively comprise instructions to determine whether a first cryptographic hash value of the one or more cryptographic hash values matches a hash output based at least in part on a subset of the one or more subsets of the verification key.

The hash output may be generated using a cryptographic hash algorithm such as SHA-256 and RIPEMD-160, such as by successively hashing an input using SHA-256 and then RIPEMD-160.

Preferably, the method may include obtaining the first script by: identifying the one or more subsets of the verification key and calculating, for each subset of the one or more subsets of the verification key, a corresponding cryptographic hash value, wherein the one or more cryptographic hash values comprises each corresponding cryptographic hash value.

Preferably, the method may include transferring control of digital assets encumbered by the transaction to the computer system contingent upon verifying the generated attestation.

Preferably, the method includes obtaining the first script from a second computer system, wherein the second computer system contributed at least part of the digital assets.

The transaction may be a Pay-to-Script-Hash (P2SH) transaction, such as a P2SH transaction in accordance with a Bitcoin-based protocol.

Preferably, at least some of the verification keys are greater or equal to 512 bytes in size and less than or equal to 520 bytes in size. In some cases, all of the verification keys are greater or equal to 512 bytes in size and less than or equal to 520 bytes in size.

Preferably, the first script is greater than or equal to 58 bytes in size and less than or equal to 104 bytes in size and the second script is greater than or equal to 1628 bytes in size and less than or equal to 1650 bytes in size.

The transaction may be a standard action in accordance with a blockchain protocol.

The one or more subsets may be exactly one subset, the one subset comprising the verification key.

The first script may further comprise a public key associated with the computer system, the identifier associated with the computer system may be a digital signature generated using a private key corresponding to the public key, and the attestation that the computer system has access to the verification key may be further based at least in part on the digital signature and the public key.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed. Any feature described above relating to a method of the invention may also be applied to the corresponding system.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Figure 1:
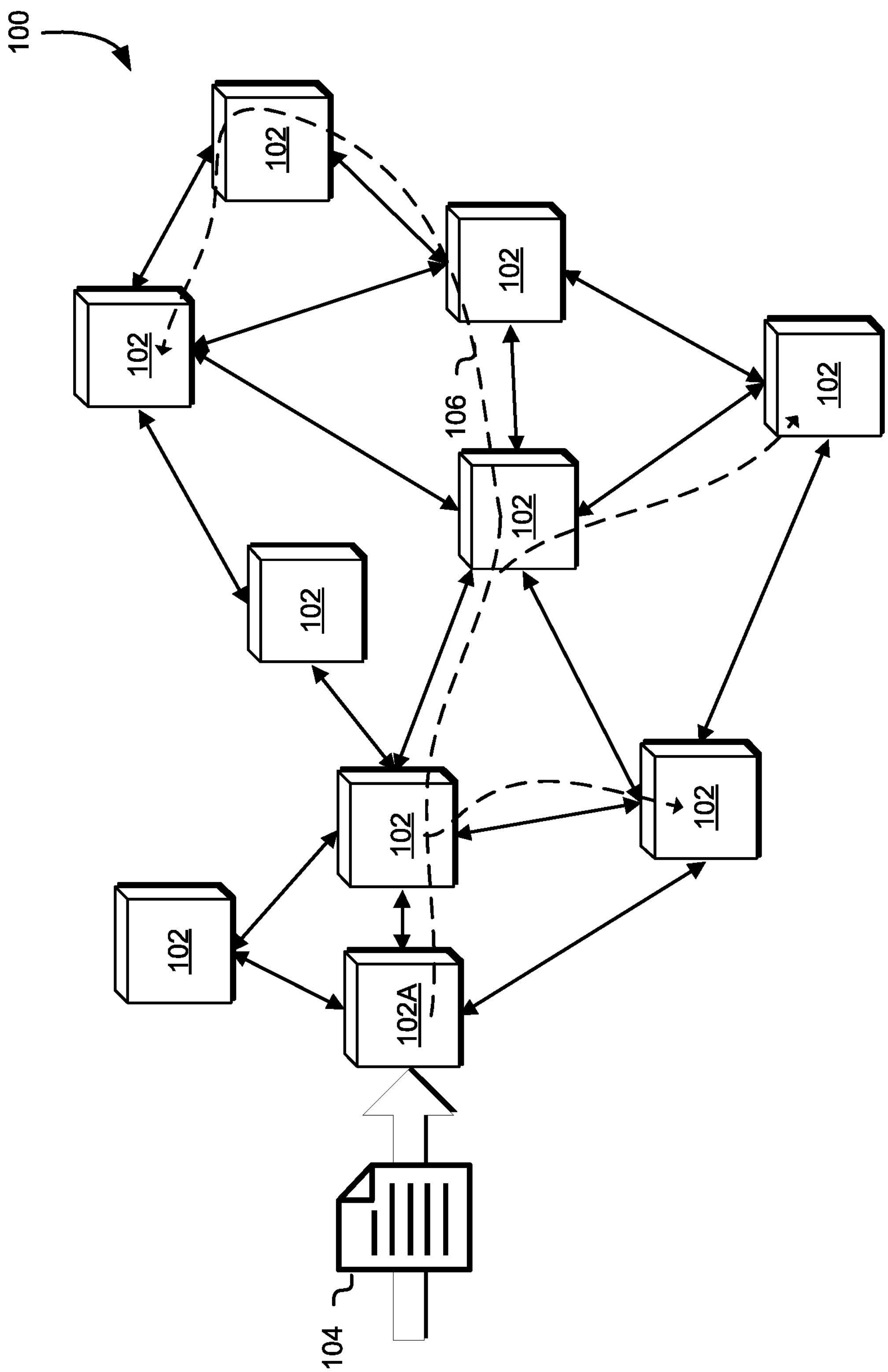
FIG. 1 illustrates a blockchain environment in which various embodiments can be implemented.

Reference will first be made to FIG. 1, which illustrates an example blockchain network 100 associated with a blockchain in accordance with an embodiment of the present disclosure. In the embodiment, the example blockchain network 100 comprises blockchain nodes that are implemented as peer-to-peer distributed electronic devices, each running an instance of software and/or hardware that performs operations that follow a blockchain protocol that is, at least in part, agreed to among operators of nodes 102. In some examples, "nodes" refers to peer-to-peer electronic devices that are distributed among the blockchain network. An example of a blockchain protocol is the Bitcoin protocol.

Figure 8:
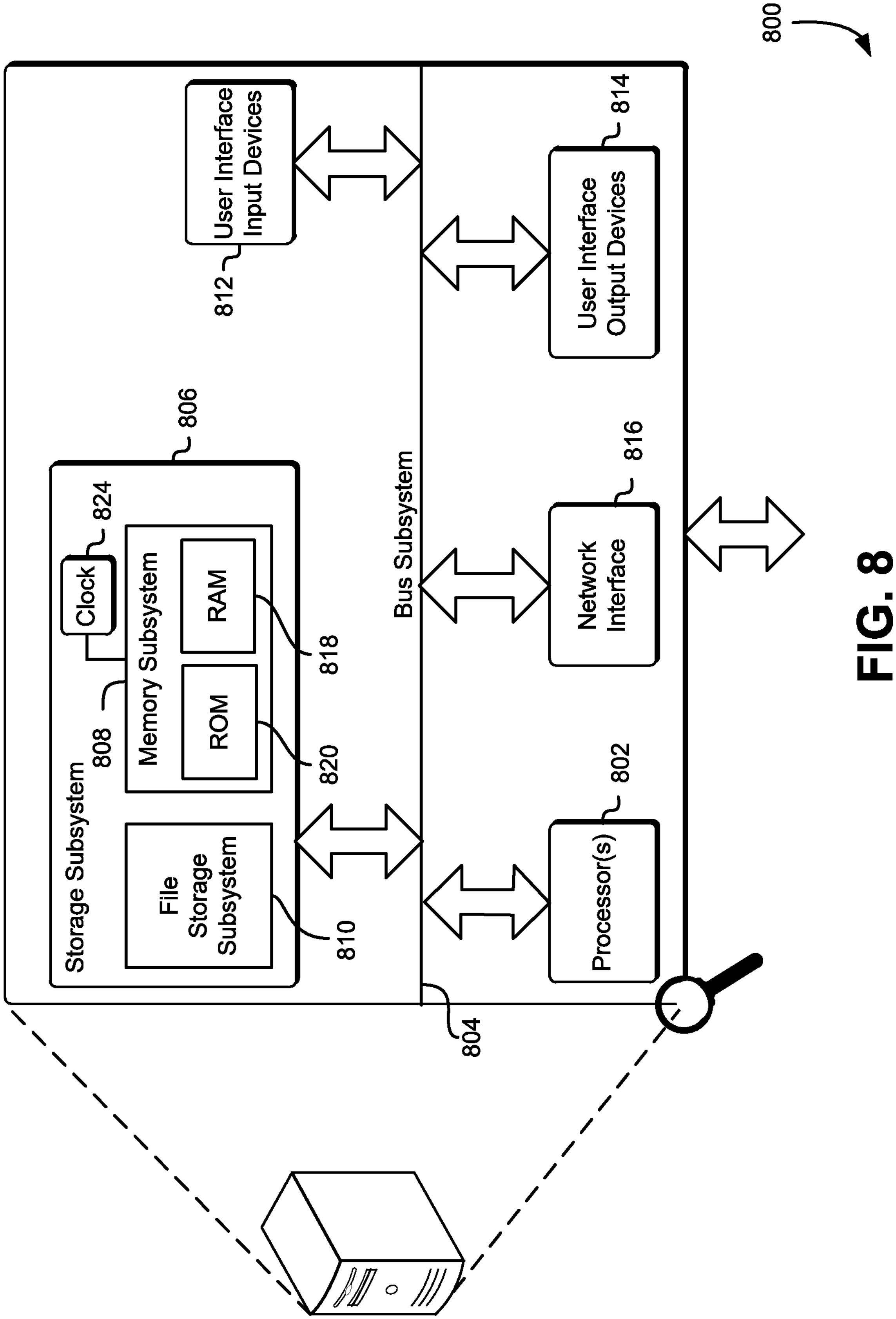
FIG. 8 illustrates a computing device that can be used to practice at least one embodiment of the present disclosure.

In some embodiments, the nodes 102 can be comprised of any suitable computing device (e.g., by a server in a data centre, by a client computing device (e.g., a desktop computer, laptop computer, tablet computer, smartphone, etc.), by multiple computing devices in a distributed system of a computing resource service provider, or by any suitable electronic client device such as the computing device 800 of FIG. 8). In some embodiments, the nodes 102 have inputs to receive data messages or objects representative of proposed transactions, such as a transaction 104. The nodes, in some embodiments, are be queryable for information they maintain, such as for information of a state of the transaction 104.

As shown in FIG. 1, some of the nodes 102 are communicatively coupled to one or more other of the nodes 102. Such communicative coupling can include one or more of wired or wireless communication. In the embodiment, the nodes 102 each maintain at least a portion of a "ledger" of all transactions in the blockchain. In this manner, the ledger would be a distributed ledger. A transaction processed by a node that affects the ledger is verifiable by one or more of the other nodes such that the integrity of the ledger is maintained.

As for which nodes 102 can communicate with which other nodes, it can be sufficient that each of the nodes in the example blockchain network 100 are able to communicate with one or more other of the nodes 102 such that a message that is passed between nodes can propagate throughout the example blockchain network 100 (or some significant portion of it), assuming that the message is one that the blockchain protocol indicates should be forwarded. One such message might be the publication of a proposed transaction by one of the nodes 102, such as node 102A, which would then propagate along a path such as a path 106. Another such message might be the publication of a new block proposed for inclusion onto a blockchain.

In an embodiment, at least some of the nodes 102 are mining nodes that perform complex calculations, such as solving cryptographic problems. A mining node that solves the cryptographic problem creates a new block for the blockchain and broadcasts the new block to others of the nodes 102. The others of the nodes 102 verify the work of the mining node and, upon verification, accept the block into the blockchain (e.g., by adding it to the distributed ledger of the blockchain). In some examples, a block is a group of transactions, often marked with a timestamp and a "fingerprint" (e.g., a hash) of the previous block. In this manner, each block may become linked to a previous block, thereby creating the "chain" that links the blocks in the blockchain. In embodiments, valid blocks are added to the blockchain by a consensus of the nodes 102. Also in some examples, a blockchain comprises a list of validated blocks.

In an embodiment, at least some of the nodes 102 operate as validating nodes that validate transactions as described in the present disclosure. In some examples, a transaction includes data that provides proof of ownership of a digital asset (e.g., a number of Bitcoins) and conditions for accepting or transferring ownership/control of the digital asset. In some examples, an "unlocking transaction" refers to a blockchain transaction that reassociates (e.g., transferring ownership or control) at least a portion of a digital asset, indicated by an UTXO of a previous transaction, to an entity associated with a blockchain address. In some examples, a "previous transaction" refers to a blockchain transaction that contains the UTXO being referenced by the unlocking transaction. In some embodiments, the transaction includes a "locking script" that encumbers the transaction with conditions that must be fulfilled before ownership/control can be transferred ("unlocked").

In some embodiments, the blockchain address is a string of alphanumeric characters that is associated with an entity to which control of at least a portion of a digital asset is being transferred/reassociated. In some blockchain protocols implemented in some embodiments, there is a one-to-one correspondence between a public key associated with the entity and the blockchain address. In some embodiments, validation of transactions involves validating one or more conditions specified in a locking script and/or unlocking script. Upon successful validation of the transaction 104, the validation node adds the transaction 104 to the blockchain and distributes it to the nodes 102.

Systems and methods described herein in relation to an illustrative application of the invention relate to the execution of locking transactions in a blockchain system. The locking transaction may refer to a transaction that initialises constraints upon which the unlocking transaction can be validated. The invention can be used, in some illustrative applications, to securely list and exchange transactions. In the context of smart contracts, it may be advantageous to have a public record (e.g., recorded on a blockchain) of a proof of correct execution of a circuit published by a worker and the verification key, thereby allowing anyone (e.g., nodes of the blockchain) to verify validity of the computation and proof. However, there are challenges to recording large blocks of data (e.g., large keys that may comprise multiple elliptic curve points) on the blockchain. For example, in a Bitcoin-based blockchain network, a protocol that utilizes standard transactions may be constrained to locking scripts and unlocking scripts that are collectively no more than 1650 bytes in size, and a redeem script (if utilized) may be limited to no more than 520 bytes in size.

A verifiable computation is a technique that allows the generation of proofs of computation. In an illustrative embodiment, such a technique can be utilized by a client to outsource, to another computing entity referred to herein as a worker, the evaluation of a function f on an input x. In some cases, the client is computationally limited so that it is infeasible for the client to perform the evaluation of the function (e.g., the expected runtime of the calculation using computing resources available to the client exceeds a maximum acceptable threshold), although such need not be the case, and the client may, generally, speaking, delegate evaluation of the function f on the input x based on any suitable criterion, such as computational runtime, computational cost (e.g., the financial cost of allocating computing resources to perform the evaluation of the function), and more.

A worker, in an embodiment, is any suitable computing entity such as a blockchain node as described in greater detail elsewhere in the present disclosure, such as those described in connection with FIGS. 1 and 8. In an embodiment, a worker (e.g., a blockchain node) evaluates the function f on input x and generates an output y and a proof $\pi$ of the correctness of the output y that can be verified by other computing entities such as the client as described above and/or other nodes of the blockchain network. Proofs, which may also be referred to as arguments, can be verified faster than doing the actual computational accordingly, computational overhead can be reduced (e.g., reducing power overhead and the cost associated with powering and running computing resources) by verifying the correctness of the proof instead of re-computing the function f over input x to determine the correctness of the output generated by the worker described above. In zero-knowledge verifiable computation the worker provides an attestation to the client that the worker knows an input with a particular property.

An efficient variant of a zero-knowledge proof of knowledge is zk-SNARK (Succinct Non-interactive ARgument of Knowledge). In an embodiment, all pairings-based zk-SNARKs include a process where the worker computes a number of group elements using generic group operations and the verifier checks the proof using a number of pairing product equations. in an embodiment, the linear interactive proof works over a finite field and the worker's and verifier's message include, encode, reference, or otherwise include information usable to determine vectors of field elements.

In an embodiment, systems and methods described herein allow mining nodes of a blockchain to perform a computation (e.g., evaluation of function f on input x) once and generate a proof that can be used to verify correctness of the output wherein evaluating correctness of the proof is computationally less expensive than evaluating the function. In this context, the cost (i.e., how expensive) of operations and tasks may refer to the computational complexity of performing the operation or task. In an embodiment, computational complexity refers to the average computational cost or the worst-case computational cost of performing the sorting algorithm for example, a heapsort algorithm and a quicksort algorithm both have an average computational cost of O(n log n), but quicksort has a worst-case computational cost of $O(n^2)$ whereas heapsort has a worst-case computation cost of O(n log n). In an embodiment, the average computational cost and/or the worst-case computational cost of evaluating the function f on input x is worse than that of evaluating correctness of the proof. Accordingly, the use of systems and methods described herein are highly advantageous and, may, for example, allow for more computationally expensive contracts to be run as such contacts would not increase the time required to validate the blockchain proportionally. Further advantages may include reduction in power consumption of verifier systems, thereby improving the efficiency of verifier computer systems and reducing the energy costs associated with running such verifier computer systems in evaluating correctness of proofs. Currently, smart contracts must be executed and validated on all nodes this constraint limits the complexity of smart contracts. Methods and systems described herein can be utilized to implement a system that improves the efficiency of the blockchain by executing a contract once to generate a proof of correctness and, based on the proof of correctness provided by the worker and the verification key provided by the client, all nodes of the blockchain can verify validity of the contract. In this way, the efficiency of the blockchain is improved by increasing the throughput of smart contracts that can be performed in aggregate by nodes of the blockchain and/or enable the computation of more computationally expensive smart contracts.

In an embodiment, a verification key $V_K$ or portions thereof can be extracted from public parameters generated in a setup phase of a zero-knowledge protocol and used together with a proof $\pi$, and the input/output data to verify the alleged proof of correctness computation provided by a worker. For example, as described in greater detail above and below, systems and methods that allow a locking script secures the verification key $V_K$ from alteration and checks the validity of the proof $\pi$, allowing the execution of a zero-knowledge protocol on blockchain during transaction validation. Accordingly, the present disclosure presents systems and methods that are suitable for recording verification keys on the blockchain wherein a worker is able to prove possession of the correct verification key $V_K$ (e.g., issued by the client) in order to redeem digital assets for the execution of a set of operations (e.g., execution of a smart contract).

Figure 2:
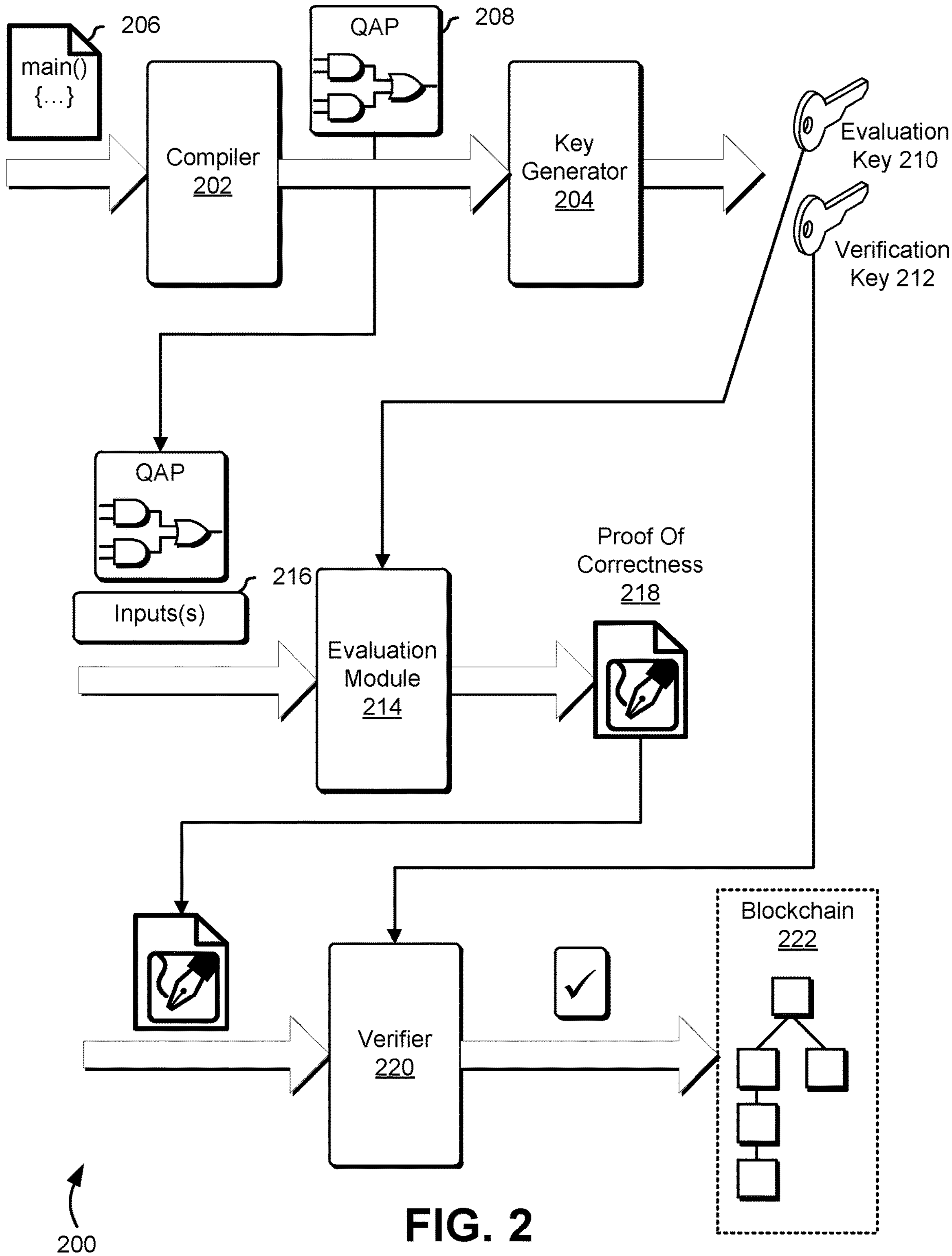
FIG. 2 illustrates a computing environment which may be utilized to implement a protocol in accordance with various embodiments.

FIG. 2 illustrates a computing environment 200 which may be utilized to implement a protocol in accordance with various embodiments. The protocol may be implemented using blockchain technologies to store proof-of-correctness and combine the "correct-by-construction" cryptography approach with smart contracts. In an embodiment, a public verifiable computation scheme comprises three phases: a setup phase, a computation phase and a verification phase.

A setup phase may be performed as part of a process to outsource the performance of computational tasks. A client, as referred to below, may refer to an entity such as a customer or client computer system that delegates performance of a computational task to a worker, which may be a different computer system. Clients may, generally speaking, delegate the performance of computational tasks for a variety of reasons, including but not limited to limited computing resources, lack of computing resources, financial costs associated with utilizing a client computer system to perform the task, energy costs associated with utilizing a client computer system to perform the task (e.g., a mobile device or laptop that relies on a battery for power may utilize a worker to perform computationally intensive tasks, thereby saving power and prolonging the usage of the battery-powered device), and more.

In an embodiment, the setup phase involves a client, customer, employee of an organization, or any other suitable entity writing contracts in a formal language with precise semantics. The contract may be written in a high-level programming language such as C or Java. Generally speaking, contracts may be expressed in any language or syntax that is or can be converted to a format that can be manipulated by a computer system. In an embodiment, a domain specific language, with a limited purpose, may provide type-safety and restricted expressivity may be utilized. The source code generated may be a precise description of a contract.

The compiler 202 may be any hardware, software, or a combination thereof that includes executable code that, if executed by one or more processors of a computer system, causes the system to take, as input, the source code 206 and produces a circuit. A compiler 202 may refer to a computer program that executes or performs instructions based on instructions that have been compiled into a machine-readable format such as binary code. It should be noted that while a compiler 202 is illustrated, interpreters, assemblers, and other suitable software and/or hardware components may be utilized to convert the source code to a circuit. In an embodiment, the circuit is an arithmetic circuit that comprises wires that carry values from a field F and connect to logical and/or arithmetic gates. In an embodiment, the circuit $\mathcal{C}$ is used by the system to generate a quadratic program $Q$ 208 that comprises a set of polynomials that provide a complete description of the original circuit $\mathcal{C}$.

In an embodiment, the compiler 202 is able to recognise a substantial subset of a programming language such as C or Java including but not limited to: pre-processor directives, static initializers, global and local functions, block-scoped variables, arrays, data structures, pointers, function calls, function operators (e.g., functors), conditionals and loops, and arithmetic and bitwise Boolean operators. In an embodiment, the compiler 202 does not support the entire set of commands in accordance with standards of the programming language (this may, in some cases, be intended to prevent certain types of algorithms from being executed in a smart contract, such as to prohibit recursive algorithms). In an embodiment, the compiler expands expressions of the source code into an arithmetic gate language to produce an arithmetic circuit. Circuit implementations have been contemplated in the past by Campanelli, M., et al. (2017) in "Zero-Knowledge Contingent Payments Revisited: Attacks and Payments for Services" and by Tillich, S. and Smart, B in "Circuits of Basic Functions Suitable For MPC and FHE." The arithmetic circuit may be utilized to build a Quadratic Arithmetic Problem (QAP) by the compiler 202 or any other suitable hardware, software, or combination thereof (e.g., a software module not illustrated in FIG. 2). The quadratic program is compiled into a set of cryptographic routines for the client (e.g., key generation and verification) and the worker (e.g., computation and proof generation) in accordance with an embodiment. In some embodiments, arithmetic circuit optimisation techniques such as those described in U.K. Pat. Application No. 1718505.9 may be utilized in order to reduce the required resources necessary for a worker to determine an outcome of the smart contract.

In an embodiment, the key generator 204 is hardware, software, or a combination thereof that includes executable code which, if executed by one or more processors of a computer system, causes the system to generate an evaluation key and a verification key from a quadratic program. Techniques for encoding computations as quadratic programs are contemplated in "Quadratic Span Programs and Succinct NIZKs without PCPs" by Gennaro, R., et al. (2013). In an embodiment, the quadratic arithmetic problem (QAP) $Q$ encodes the circuit $\mathcal{C}$ over a field F and contains a set of m+1 polynomials:

$$V=\{v_k(x)\},\ W=\{w_k(x)\},\ Y=\{y_k(x)\}$$

with $0 \le k \le m$. A target polynomial t(x) is also defined. Given a function $f$ that takes n elements of F as input and outputs n' elements, with N=n+n', then $Q$ computes $f$ if $\{c_1, \ldots, c_N\} \in F^N$ is a valid assignment of the group of input and outputs off and if there exists a list of coefficients $\{c_{N+1}, \ldots, c_m\}$ such that t(x) divides p(x):

$$p(x) = \left(v_0(x) + \sum_{k=1}^{m} c_k \cdot v_k(x)\right) \cdot \left(w_0(x) + \sum_{k=1}^{m} c_k \cdot w_k(x)\right) - \left(y_0(x) + \sum_{k=1}^{m} c_k \cdot y_k(x)\right)$$

Therefore, in an embodiment, there must exist some polynomial h(x) such that h(x)·t(x)=p(x). The size of $Q$ is m, and its degree is the degree of t(x).

In an embodiment, building a QAP for an arithmetic circuit comprises selecting an arbitrary root $r_g \in F$ for each multiplication gate g in the circuit and defining the target polynomial to be $t(x)=\Pi_g(x-r_g)$. In an embodiment, an index $k \in \{1 \ldots m\}$ is associated to each input of the circuit and to each output from a multiplication gate. The polynomials in V encode the left input into each gate, the W encode the right input into each gate, and the Y encode the outputs. For instance, $v_k(r_g)=1$ if the k-th wire is a left input to gate g, and $v_k(r_g)=0$ otherwise. Therefore, for a particular gate g and its root $r_g$, the previous Equation can be simplified as follows:

$$\left(\sum_{k=1}^{m} c_k \cdot v_k(r_g)\right) \cdot \left(\sum_{k=1}^{m} c_k \cdot w_k(r_g)\right) = \left(\sum_{k \in I_{left}} c_k\right) \cdot \left(\sum_{k \in I_{right}} c_k\right) = c_g y_k(r_g) = c_g$$

The output value of the gate is equal to the product of its inputs. The divisibility check decomposes into deg(t(x)) separate checks, one for each gate g and root $r_g$ of t(x), such that $p(r_g)=0$. Addition gates and multiplication-by-constant gates do not contribute to the size or degree of the QAP.

In an embodiment, the QAP is defined over a field Fp, where p is a large prime. In an embodiment, it is desirable that QAP over Fp efficiently computes any function that can be expressed in terms of addition and multiplication modulo p. An arithmetic split gate may be designed to translate an arithmetic wire $a \in$ Fp, known to be in $[0, 2^{k-1}]$, into k binary output wires. Accordingly, it follows that, Boolean functions can be expressed using arithmetic gates. For instance, NAND(a,b)=1 ab. Each embedded Boolean gate costs only one multiply operation. Moreover, new gates such as split can be defined as standalone and composed with other gates. Given input $a \in F_p$ known to be in $[0, 2^{k-1}]$, the split gate outputs k wires holding the binary digits $a_1, \ldots, a_k$ of a such $\Sigma^k 2^{i-1} a_i = a$ and each $a_i$ is either 0 or 1.

Finally, the public parameters to be used by all provers and verifiers are generated by the system as part of the setup phase. It should be noted that the evaluation key $E_K$ and the verification key $V_K$ are derived using a secret value selected by the client. A key generator 204 may utilize the quadratic arithmetic program (QAP) in connection with the key generation algorithm to generate the evaluation key $E_K$ 210 and the verification key $V_K$ 212.

In an embodiment, performing a computational task involves the computation of a function on an input 216 (i.e., a process for evaluating f(x)) by a worker. In an embodiment, the worker is any suitable computer system that the client may delegate a computational task to. The input 216, in an embodiment, includes information that attests to the worker's identity, such as a digital signature generated using a private key associated with the worker. In an embodiment, the worker is a computer system that the client transfers digital assets to as a result of successful computation. The client, in an embodiment provides an input x and the evaluation key $E_K$ to a worker, the worker uses the evaluation module 214 to a compute routine to compute the output y (i.e., y=f(x) wherein the input is x and the function is f) and uses the evaluation key $E_K$ 210 to produce a proof-of-correctness 218. The evaluation module, in an embodiment, is hardware and/or software that includes instructions that, if executed by one or more processors of a computer system, cause the computer system to evaluate the values of the internal circuit wires of the QAP 208 and produce an output y of the QAP.

In an embodiment, each polynomial $v_k(x)$ E F of the quadratic program is mapped to an element $g^{vk(s)}$ in a bilinear group, where s is a secret value selected by the client, g is a generator of the group, and F is the field of discrete logarithms of g. In an embodiment, for a given input, the worker evaluates the circuit to obtain the output and the values of the internal circuit wires, which correspond to the coefficients $c_i$ of the quadratic program. Accordingly, a worker can evaluate $v(s)=\Sigma_{k\in\{m\}} c_k \cdot v_k(s)$ to get $g^{v(s)}$; compute w(s) and y(s); compute $h(x)=p(x)/t(x)=\Sigma^d h_i \cdot x^i$; and compute $g^{h(s)}$ using the $h_i$ and $g^{s(i)}$ terms in the evaluation key. In an embodiment, the proof-of-correctness 218 comprises $(g^{v(s)}, g^{w(s)}, g^{y(s)}, g^{h(s)})$ and a verifier uses the bilinear map to check that p(s)=h(s)·t(s). In an embodiment, the proof π is stored on the blockchain 222 for later use or can be verified by multiple parties without requiring the prover to separately interact with each of these. In an embodiment, the evaluation of the circuit storage of the proof-of-correctness may be performed to unlock resources (e.g., digital assets) encumbered by a locking script of a transaction.

In an embodiment, the proof π is broadcast to a blockchain network and a verifier 220 is used to verify the proof. In an embodiment, the verifier 220 is a computing entity such as a node of the block chain. It should further be noted that in some cases, the computing entity that verifies the proof is the same computing entity that generates the evaluation key $E_K$ and verification key $V_K$. In an embodiment, nodes of blockchain can validate a payment transaction using the verification key $V_K$ and the proof π, thus validating the contract if the verification succeeds. One requirement of the protocol is that the worker cannot provide incorrect proofs, even when it knows the verification key $V_K$. Thus, in this protocol, a common reference string (CRS) is produced by the client or by a trusted third party who publishes at least the evaluation key $E_K$ and verification key $V_K$. In an embodiment, the published verification key $V_K$ can be used by any computing entity to verify computations. In some embodiments, the verification phase is executed using blockchain scripts (e.g., in a Bitcoin-based network) that store the elements used in the verification of the computation, which may be in accordance with techniques described in U.K. Pat. Application No. 1719998.5.

Using techniques described herein, a client is able to partially obfuscate transaction data, such as the identity of the recipients of a blockchain transaction. In an embodiment, the unlocking script does not expose the recipient's address and the recipient's public key. However, in some cases, the value of the transaction (e.g., amount of digital assets transferred) may be visible to nodes of the blockchain network. In an embodiment, cryptographic techniques as described above and below are utilized by the client to covert locking scripts into quadratic arithmetic programs and the worker to solve arithmetic programs to generate proofs.

Generally speaking, a client is able to use standard transactions (e.g., standard transactions as defined in a Bitcoin-based blockchain network) such as P2PK and P2PKH to pay a counterparty or worker. For example, in an embodiment, a client converts a P2PK locking script into an arithmetic circuit and broadcasts a payment transaction that includes a puzzle derived from the circuit. A counterparty or worker receives the circuit, provides an appropriate input (e.g., information that attests to the worker's identity such as a shared secret between the client and the worker or a digital signature generated using the worker's private key) and runs the circuit to generate a proof-of-correctness $\pi$. In an embodiment, the proof is used to unlock resources (e.g., digital assets), and furthermore, it may be the case that information identifying the counterparty or worker (e.g., a public key and/or digital signature associated with the counterparty or worker) is not recorded to the blockchain in an unobfuscated format.

In an embodiment, the verification key and the corresponding proof are generated according to techniques described above and/or below. Accordingly, a verifier is given verification key $V_K$ and proof $\pi$:

$$V_K = \left\{ \begin{array}{c} \mathcal{P} \\ \mathcal{Q} \\ \alpha_v \mathcal{Q} \\ \alpha_w \mathcal{Q} \\ \alpha_w \mathcal{P} \\ \alpha_y \mathcal{Q} \\ \beta \mathcal{P} \\ \beta \mathcal{Q} \\ r_y t(s) \mathcal{P} \\ r_v v_i(s) \mathcal{P} \\ r_w w_i(s) \mathcal{Q} \\ r_y y_i(s) \mathcal{P} \end{array} \right\}_{i=0 \ldots N}$$

$$\text{Proof } \pi = \left\{ \begin{array}{c} \sum_{i=N+1}^{m} a_i r_v v_i(s) \mathcal{P} \\ \sum_{i=N+1}^{m} a_i \alpha_v r_v v_i(s) \mathcal{P} \\ \sum_{i=N+1}^{m} a_i r_w w_i(s) \mathcal{Q} \\ \sum_{i=N+1}^{m} a_i \alpha_w r_w w_i(s) \mathcal{P} \\ \sum_{i=N+1}^{m} a_i r_y y_i(s) \mathcal{P} \\ \sum_{i=N+1}^{m} a_i \alpha_y r_y y_i(s) \mathcal{P} \\ \sum_{i=N+1}^{m} a_i (r_v \beta v_i(s) + r_w \beta w_i(s) + r_y \beta y_i(s)) \mathcal{P} \\ \sum_{i=0}^{d} h_i s^i \mathcal{Q} \end{array} \right\}$$

such that the verifier computes a plurality of elliptic curve multiplications (e.g., one for each public input variable) and five pair checks, one of which includes an additional pairing multiplication.

Given verification key $V_K$, proof $\pi$, and $(a_1, a_2, \ldots, a_N)$, to verify that $t(x)$ divides $p(x)$ and hence $(x_{N+1}, \ldots, x_m) = f(x_0, \ldots, x_N)$, the verifier proceeds as follows. First it checks all the three $\alpha$ terms:

$$e(\alpha_v r_v V_{mid}(s) \mathcal{P}, \mathcal{Q}) = e(r_v V_{mid}(s) \mathcal{P}, \alpha_v \mathcal{Q})$$

$$e(\alpha_w r_i W_{mid}(s) \mathcal{P}, \mathcal{Q}) = e(\alpha_w \mathcal{P}, r_w W_{mid}(s) \mathcal{Q})$$

$$e(\alpha_y r_y Y_{mid}(s) \mathcal{P}, \mathcal{Q}) = e(r_y Y_{mid}(s) \mathcal{P}, \alpha_y \mathcal{Q})$$

wherein $$V_{mid}(s) = \sum_{i=N+1}^{m} a_i v_i(s),\ W_{mid}(s) = \sum_{i=N+1}^{m} a_i w_i(s), \text{ and}$$
$$Y_{mid}(s) = \sum_{i=N+1}^{m} a_i y_i(s).$$

Then, the verifier checks the term $$e(r_v V_{mid}(s) \mathcal{P} + r_y Y_{mid}(s) \mathcal{P}, \beta \mathcal{Q}) \cdot e(\beta \mathcal{P}, r_w W_{mid}(s) \mathcal{Q}) = e(Z_{mid}(s) \mathcal{P}, \mathcal{Q})$$

and $$Z_{mid}(s) = \sum_{i=N+1}^{m} a_i (r_v \beta v_i(s) + r_w \beta w_i(s) + r_y \beta y_i(s)).$$

Finally, the verifier checks the divisibility requirement:

$$e(r_v V(s) \mathcal{P}, r_w W(s) \mathcal{Q}) = e(r_y Y(s) \mathcal{P}, \mathcal{Q}) \cdot e(r_y t(s) \mathcal{P}, h(s) \mathcal{Q}) \text{ wherein}$$
$$r_v V(s) \mathcal{P} = \sum_{i=0}^{m} r_v a_i v_i(s) \mathcal{P},\ r_w W(s) \mathcal{Q} = \sum_{i=0}^{m} r_w a_i w(s) \mathcal{Q},$$
$$r_y Y(s) \mathcal{P} = \sum_{i=0}^{m} r_y a_i y(s) \mathcal{P}, \text{ and } h(s) \mathcal{Q} = \sum_{i=0}^{d} h_i \mathcal{Q}.$$

Thus, upon considering the notation from the sections described above and the examples described in this disclosure, the verification comprises a set of pair checks of the following elements, in accordance with one embodiment:

$$e(\pi_2, V_K^2) = e(\pi_1, V_K^3)$$

$$e(\pi_4, V_K^2) = e(V_K^5, \pi_3,)$$

$$e(\pi_6, V_K^2) = e(\pi_5, V_K^6)$$

$$e((\pi_1 + \pi_6), V_K^2) = e(\pi_7, V_K^2)$$

$$e((a_0 V_K^{10} + a_1 V_K^{11} + a_2 V_K^{12} + a_3 V_K^{13} + a_4 V_K^{14} + \pi_2 + a_7 V_K^{15}),$$
$$(a_0 V_K^{16} + a_1 V_K^{17} + a_2 V_K^{18} + a_3 V_K^{19} + a_4 V_K^{20} + \pi_4 + a_7 V_K^{21})) =$$
$$e((a_0 V_K^{22} + a_1 V_K^{23} + a_2 V_K^{24} + a_3 V_K^{25} + a_4 V_K^{26} + \pi_6 + a_7 V_K^{15}), V_K^2) * e(V_K^9, \pi_8)$$

Figure 3:
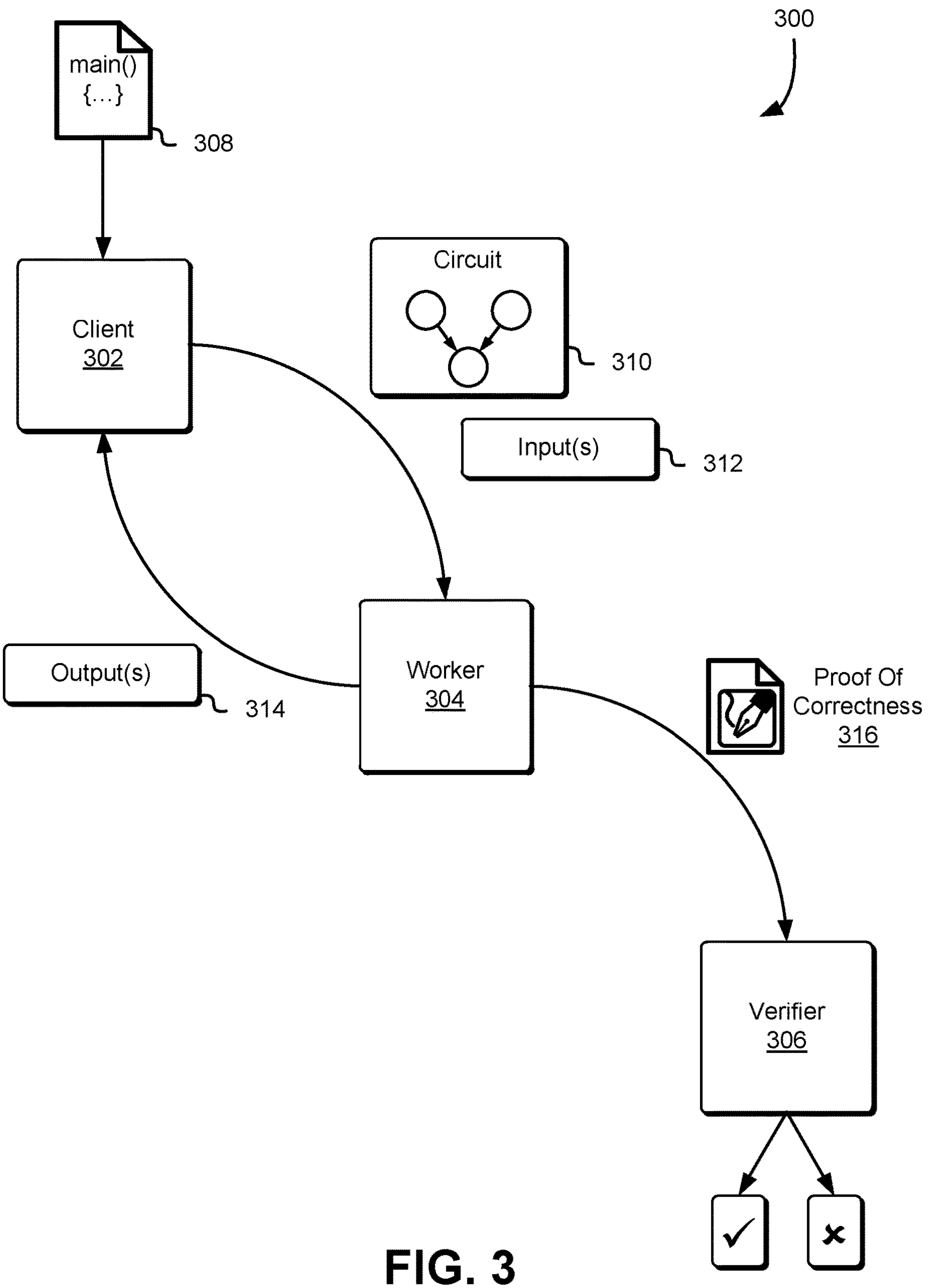
FIG. 3 illustrates a diagram of an environment suitable for performance of a verifiable computation.

FIG. 3 illustrates a diagram 300 for coordinating the performance of a verifiable computation. The client 302, worker 304, and verifier 306 may be nodes of a blockchain network. The client 302 may be any suitable computer system any may include executable code which, if executed by one or more processors of a computer system, causes the computer system to receive a smart contract 308. In an embodiment, the smart contract 308 is encoded in a high-level programming language as source code such as C, C++, or Java. In an embodiment, software such as a compiler, interpreter, and/or assembler may be utilized to transform the smart contract 308 to an arithmetic circuit 310, which consists of "wires" that carry values from a field $\mathbb{F}$ and connect to addition and multiplication gates. It should be noted that the arithmetic circuit may refer to a logical circuit that can be implemented by a physical circuit comprising a series of physical gates (e.g., using transistor-transistor logic (TTL) integrated circuits such as 7400-series gates, flip-flops, buffers, decoders, multiplexers, and the like) connected by physical wires.

In an embodiment, the client 302 provides the worker 304 with an arithmetic circuit 310 and an input 312 to the circuit. The circuit 310 may be used to generate a quadratic program $\mathcal{Q}$ that comprises a set of polynomials that provide a complete description of the original circuit. In either case, the worker 304 may execute the circuit $\mathcal{C}$ or the quadratic program $\mathcal{Q}$ on the input 312 to generate one or more outputs 314. In some embodiments, the worker (i.e., the prover) is expected to obtain, as the output, a valid transcript for $\{\mathcal{C}, x, y\}$ that is an assignment of values to the circuit wires such that the values assigned to the input wires are those of x, the intermediate values correspond to the correct operation of each gate in $\mathcal{C}$, and the values assigned to the output wire(s) is $y$; if the claimed output is incorrect (i.e., $y \neq \mathcal{P}(x)$), then a valid transcript for $\{\mathcal{C}, x, y\}$ does not exist. In an embodiment, the worker is expected to provide a subset of the values of the circuit wires, wherein the selected subset of the values of the circuit wires are not known to the worker a priori.

In embodiments, the output $y$, the values of the internal circuit wires (or a subset thereof), and the evaluation key EK are used to produce the proof-of-correctness 316. The proof $\pi$ can be stored on the blockchain and verified by multiple parties without requiring the worker 304 to separately interact with the multiple parties. In this manner, a verifier 306 can validate the payment transaction using the public verification key VK and the proof $\pi$, thereby validating the contract. In some cases, the client 302 may reclaim digital assets encumbered by the payment transaction if the verification fails.

Systems and methods for recording verification keys on a blockchain network are described herein. In many cases, a blockchain system or network is used for ordinary (standard) transactions such as those described above. It is possible, in accordance with an embodiment of this disclosure, to provision systems for creation and processing of smart contracts by applying an implementation of zero-knowledge succinct non-interactive argument of knowledge (zk-SNARKs).

In an embodiment, transactions contain small programs known as scripts embedded into their inputs and outputs, which specify how and by whom the outputs of the transactions can be accessed. On the Bitcoin platform, these scripts are written using a stack-based scripting language. A blockchain may, furthermore, impose constraints related to the maximum data threshold for the amount of data that can be stored in a block, and protocols may be selected based on the size of keys (e.g., a verification key $V_K$ that encodes multiple elliptic curve points) in relation to the maximum allowable size. For example, in a Bitcoin-based protocol, the total size of the locking and unlocking scripts may not, in an embodiment, exceed 1650 bytes and the size of a redeem script may not exceed 520 bytes. In an embodiment, the unlocking script and/or redeem script include instructions (e.g., opcodes) in addition to encoding verification keys, and may further include additional instructions and/or data for verifying that the worker is in possession of the verification key (e.g., by verifying a digital signature). Accordingly, it is challenging to generate scripts that provide some or all of the functionality as described above, especially in connection with the use of larger key sizes, which may, in an embodiment, provide greater security and/or cryptographic assurances of security.

In an embodiment, as part of a locking transaction, a client publishes a common reference string (CRS) comprising evaluation and verification keys. In an embodiment, CRS=$\{E_K, V_K\}$, although it should be noted that, as stated previously, the common reference string can include any additional suitable information. The size of the evaluation key $E_K$ is based at least in part on the size of the circuit under consideration (e.g., the number of elements making up the evaluation key $E_K$ corresponds to and/or is proportional to the number of internal gates of a circuit). The size of the verification key, in an embodiment, depends on the inputs and outputs only. In many cases, it is useful to have a public record of a proof (e.g., a proof of work or a proof of correct execution, as published by the prover/worker) and a corresponding verification key $V_K$—accordingly, any entity that has access to the proof and the verification key $V_K$ is able to verify validity of the computation and the proof. In an embodiment, the verifier 306 is any suitable entity such as a node of a blockchain. It should further be noted that in some embodiments, the verifier 306 and the client 302 are the same computer system. In other words, in some embodiments, any computer system with access to a blockchain network is able to perform a verification process that determines the validity of a computation and proof provided by an alleged prover/worker.

In some systems, the identity of the worker is known and the client is able to pay for the execution of the contract directory to the worker. In an embodiment, the client pays the worker directly by obtaining an address associated with the worker and transferring digital assets to the address associated with the worker.

Figure 4:
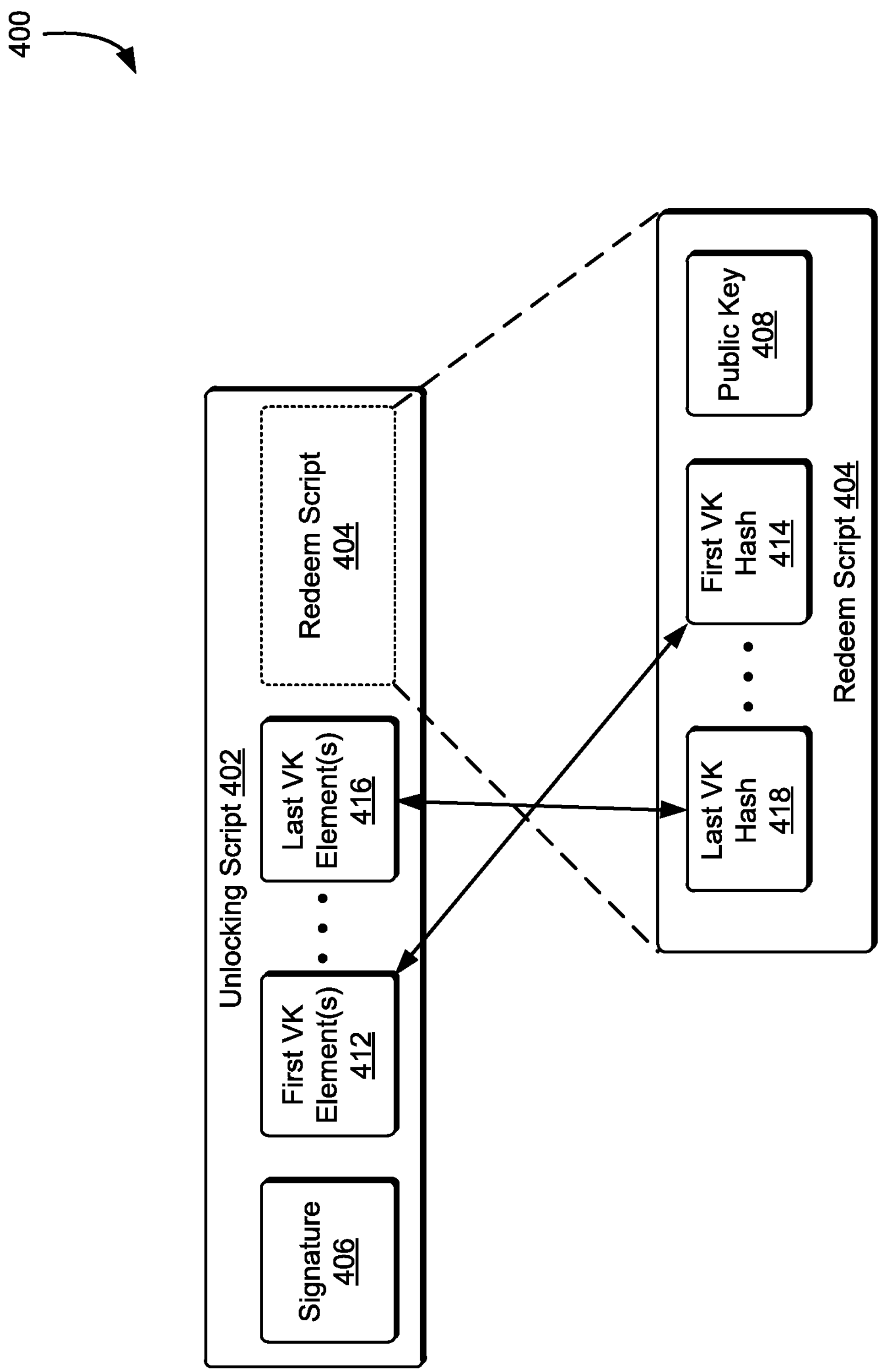
FIG. 4 illustrates a diagram of data structures in accordance with a blockchain protocol that are suitable for recording verification keys on the blockchain wherein a worker is able to prove possession of the correct verification key $V_K$.

In accordance with various embodiments, FIG. 4 illustrates a diagram 400 of data structures in accordance with a blockchain protocol that are suitable for recording verification keys on the blockchain wherein a worker is able to prove possession of the correct verification key $V_K$ (e.g., issued by the client) in order to redeem digital assets for the execution of a set of operations (e.g., execution of a smart contract). Furthermore, in some embodiments, the protocol allows for inclusion of the proof of correctness when redeeming the reward for execution of the contract. In an embodiment, the protocol is implemented in accordance with existing blockchain protocols—for example, systems and methods described herein can be implemented on an existing Bitcoin network without requiring modifications to the Bitcoin protocol.

In an embodiment, a blockchain system supports various types of transactions. In an embodiment, a supported transaction (e.g., a standard transaction) is a script-hash-based transaction such as a Pay-to-Script-Hash (P2SH) transaction in accordance with a Bitcoin-based system. Generally speaking, a script-hash-based transaction refers to any transaction wherein verifying the validity of an unlocking script includes providing a script that matches a specified cryptographic hash value. For example, in a Bitcoin-based P2SH transaction, an unlocking script comprises a redeem script and a locking script comprises at least one condition that the hash of the redeem script supplied by the unlocking script matches a specified value. For example, in a Bitcoin-based system, a locking script may be described based on the following:

OP_HASH160<20-byte hash of redeem script> OP_EQUAL

In an embodiment, the diagram 400 illustrate in FIG. 4 illustrates an outline of a structure suitable for encoding verification keys wherein the worker is able to prove possession of the correct verification key $V_K$. The unlocking script 402 and redeem script 404 may be implemented in accordance with those described in accordance with Pay-To-Script-Hash (P2SH) transactions. In some cases, the blockchain protocol enforces a maximum total size on the unlocking script 402 and a corresponding locking script and/or enforces a maximum total size on the redeem script

404. For example, in a Bitcoin-based system, the redeem script of a P2SH standard transaction must be 520 bytes or smaller.

The unlocking script 402 comprises a collection of data parameters which satisfy a set of conditions placed in a corresponding locking script. For a P2SH transaction, the locking script typically includes a hash value and requires that the unlocking script includes a redeem script wherein a hash of the redeem script matches the hash value encoded in the locking script. Accordingly, in an embodiment, the locking script encodes the set of conditions indirectly by encoding a hash value based at least in part on the set of constraints and requiring the redeem script presented in the unlocking script to encode the set of constraints.

Turning to specifics, the unlocking script 402 illustrated in FIG. 4 comprises a digital signature 406, one or more subsets of the verification key $V_K$ (e.g., a first subset 412 and a last subset 416), a redeem script 404, and additional opcodes (also referred to as commands, operations, functions, and instructions throughout this disclosure) that, if executed, provide cryptographically verifiable assurances that the worker is in possession of the verification key $V_K$. In an embodiment, the digital signature 406 is generated using a private key of the worker and authenticity of the digital signature 406 is cryptographically verifiable using the public key 408 associated with the worker. The public key 408 associated with the worker may be encoded in the redeem script 404. Accordingly, the digital signature 406 acts as an attestation that the worker is in possession of the verification key $V_K$.

The verification key $V_K$, in an embodiment, comprises a plurality of elements $$\{V_K^1, V_K^2, V_K^3, \ldots, V_K^n\}$$

wherein each element is a point on an elliptic curve. Elements of the verification key $V_K$ may be partitioned into one or more subsets. For example in FIG. 4, the diagram 400 illustrates an example where there are at least two subsets, a first subset 412 and a last subset 416—the ellipses denote that there may be additional subsets between the first and last subsets, but such need not be the case—for example, there may be two subsets wherein the second subset is the last subset 416. In an embodiment, each subset as described in this context is non-overlapping with any other subset—in other words, if an element $$V_K^i$$

is in one subset, it is not a member of any other subset. Furthermore, in an embodiment, each element of the verification key $V_K$ is in a member of exactly one subset.

It should be noted that in some cases, the verification key $V_K$ is not partitioned into multiple non-overlapping subsets and instead is encoded as a single block (i.e., in its entirety) in the unlocking script 402, and a single hash is encoded in the redeem script 404. The unlocking script would function in a similar manner to the embodiment described above and below in connection with the discussion of FIG. 4, wherein the sole hash value is compared against the output of hashing the entire verification key $V_K$.

Continuing with the above referenced discussion of the unlocking script 402, the unlocking script may furthermore comprise a redeem script 404. In an embodiment, the redeem script is a set of parameters that, produces a hash output that matches a value encoded in a corresponding locking script. In an embodiment, the locking script, unlocking script, and redeem script are utilized in a two-step process wherein during the first step, the redeem script is checked against the locking script to determine whether the redeem script satisfies the conditions of the locking script, which may include a condition that a hash of the redeem script matches a predetermined value. In an embodiment, the OP_HASH160 opcode is utilized, which hashes the input first with SHA-256 and then with RIPEMD-160 to produce a hash output. In an embodiment, the hash output of an OP_HASH160 operation is 20 bytes (0x14 bytes) in size.

As stated above, the unlocking script 402 may further comprise opcodes wherein the unlocking script 402 comprises commands and data that, if executed, provide cryptographically verifiable assurances that the worker is in possession of the verification key $V_K$. For example, one such unlocking script, for an embodiment wherein the verification key $V_K$ is divided into two subsets, may be described in the following manner, illustrated using instructions and data (in brackets) in accordance with a stack-based scripting language such as those utilized by Bitcoin-based systems:

OP_PUSHDATA1<length of signature><signature>
OP_PUSHDATA1<byte-length of VK1> VK1
OP_PUSHDATA1<byte-length of VK2> VK2
OP_PUSHDATA1<length of redeem script><redeem script> wherein, as stated above, commands (e.g., "OP_PUSHDATA1") are described without brackets and data is described with brackets (e.g., "<length of signature>" is a 1-byte integer corresponding to the size, in bytes, of the digital signature 406). The notation VK1 refers to a first subset of the verification key $V_K$, and VK2 refers to a second subset of the verification key $V_K$ such that verification key $$V_K = VK1 \| VK2 \text{ and } VK1 = V_K^1 \| V_K^2 \ldots \| V_K^i \text{ and } VK2 = V_K^{i+1} \| V_K^{i+2} \ldots \| V_K^n.$$

It should be noted that in some cases, the various subsets of verification key $V_K$ have the same size (e.g., all or some subsets include the same number of elements of the verification key $V_K$) but such need not be the case. Additionally "<redeem script>" refers to the functions and data of the redeem script, such as the example redeem script described below.

In an embodiment, the redeem script 404 is utilized to satisfy one or more conditions encoded in a locking script. For example, a locking script may include a hash value and a condition that the unlocking script include a routine wherein a hash output over the routine results in an output value that matches the hash value included in the locking script. The routine, in an embodiment, is the redeem script 404. In an embodiment, the redeem script 404 comprises, for each subset of the verification key $V_K$, a corresponding hash value, a public key 408 associated with the worker, and additional opcodes (also referred to as commands, operations, functions, and instructions throughout this disclosure) that, if executed, provide cryptographically verifiable assurances that the worker is in possession of the verification key $V_K$. In an embodiment, the redeem script 404 is executed in the context of the unlocking script 402. In an embodiment, the hash values encoded in the redeem script are encoded in the reverse order in which the corresponding subsets of the verification key $V_K$ appear in the unlocking script 402. For example, if the first subset 412 appears first in the unlocking script 402, then the corresponding first VK hash 414 is the last hash value to appear in the redeem script 404. Likewise, the last VK hash 418 corresponding to the last subset of the verification key appears first in the redeem script, relative to the hashes of other subset of the verification key. It should be noted, in this context, the ordering refers to the relative ordering of the hash values and does not imply or impose any ordering relative to other data and other commands encoded in the redeem script 404. Continuing with the previous example, a suitable redeem script is described in the following manner:

OP_HASH160<HVK1>OP EQUALVERIFY OP_HASH160<HVK2>

OP_EQUALVERIFY<PubKey worker>OP_CHECKSIG wherein, as stated above, commands (e.g., "OP_HASH160") are described without brackets and data is described with brackets (e.g., "<HVK1>" is a 20-byte value corresponding to the result of applying the OP_HASH160 operation to VK1). In an embodiment, the redeem script is provided by the client to the worker. It should be noted that the redeem script 404, in an embodiment, does not directly provide any information regarding the values of the verification key $V_K$ that may be usable to facilitate a cryptographic attack to determine the verification key $V_K$.

In an embodiment, a blockchain protocol defines a maximum size the unlocking script 402 to be 1650 bytes, inclusive. The blockchain protocol may further define a maximum size of 520 bytes as the largest whole chunk of data that can be pushed on the stack. In an embodiment the elements of the verification key are each 32 bits in size. Accordingly, an unlocking script 402 in accordance with the above constraints may include the following:

| Script | Size (bytes) | Description |
|---|---|---|
| 0x4c | 1 | OP_PUSHDATA1 opcode |
| <length of signature> | 1 | Length of digital signature |
| <signature> | 71-73 | Digital signature of worker |
| 0x4d | 1 | OP_PUSHDATA2 opcode |
| 0x200 | 2 | Byte-length of VK1 |
| <VK1> | 512 | $VK1 = V_K^1 \| \| V_K^2 \ldots \| \| V_K^{16}$ |
| 0x4d | 1 | OP_PUSHDATA2 opcode |
| 0x200 | 2 | Byte-length of VK2 |
| <VK2> | 512 | $VK2 = V_K^{17} \| \| V_K^{18} \ldots \| \| V_K^{32}$ |
| 0x4d | 1 | OP_PUSHDATA2 opcode |
| 0x1A0 | 2 | Byte-length of VK3 |
| <VK3> | 416 | $VK3 = V_K^{33} \| \| V_K^{34} \ldots \| \| V_K^{45}$ |
| 0x4c | 1 | OP_PUSHDATA1 opcode |
| 0x68 | 1 | Length of redeem script |
| | redeem script | |
| 0xA9 | 1 | OP_HASH160 opcode |
| 0x14 | 1 | Next 20 bytes is data to be pushed onto the stack |
| <HVK3> | 20 | Hash of VK3 |
| 0x88 | 1 | OP_EQUALVERIFY opcode |
| 0xA9 | 1 | OP_HASH160 opcode |
| 0x14 | 1 | Next 20 bytes is data to be pushed onto the stack |
| <HVK2> | 20 | Hash of VK2 |
| 0x88 | 1 | OP_EQUALVERIFY opcode |
| 0xA9 | 1 | OP_HASH160 opcode |
| 0x14 | 1 | Next 20 bytes is data to be pushed onto the stack |
| <HVK1> | 20 | Hash of VK1 |
| 0x88 | 1 | OP_EQUALVERIFY opcode |
| 0x21 | 1 | Next 33 bytes is data to be pushed onto the stack |

-continued

| Script | Size (bytes) | Description |
|---|---|---|
| <PubKey Worker> | 33 | Public key of worker |
| 0xAC | 1 | OP_CHECKSIG opcode |
| Total Size: | 1630 | |

accordingly, the unlocking script and redeem script described above may be utilized to encode a verification key $V_K$ having 45 elements, each element being 32 bytes in size.

Figure 5:
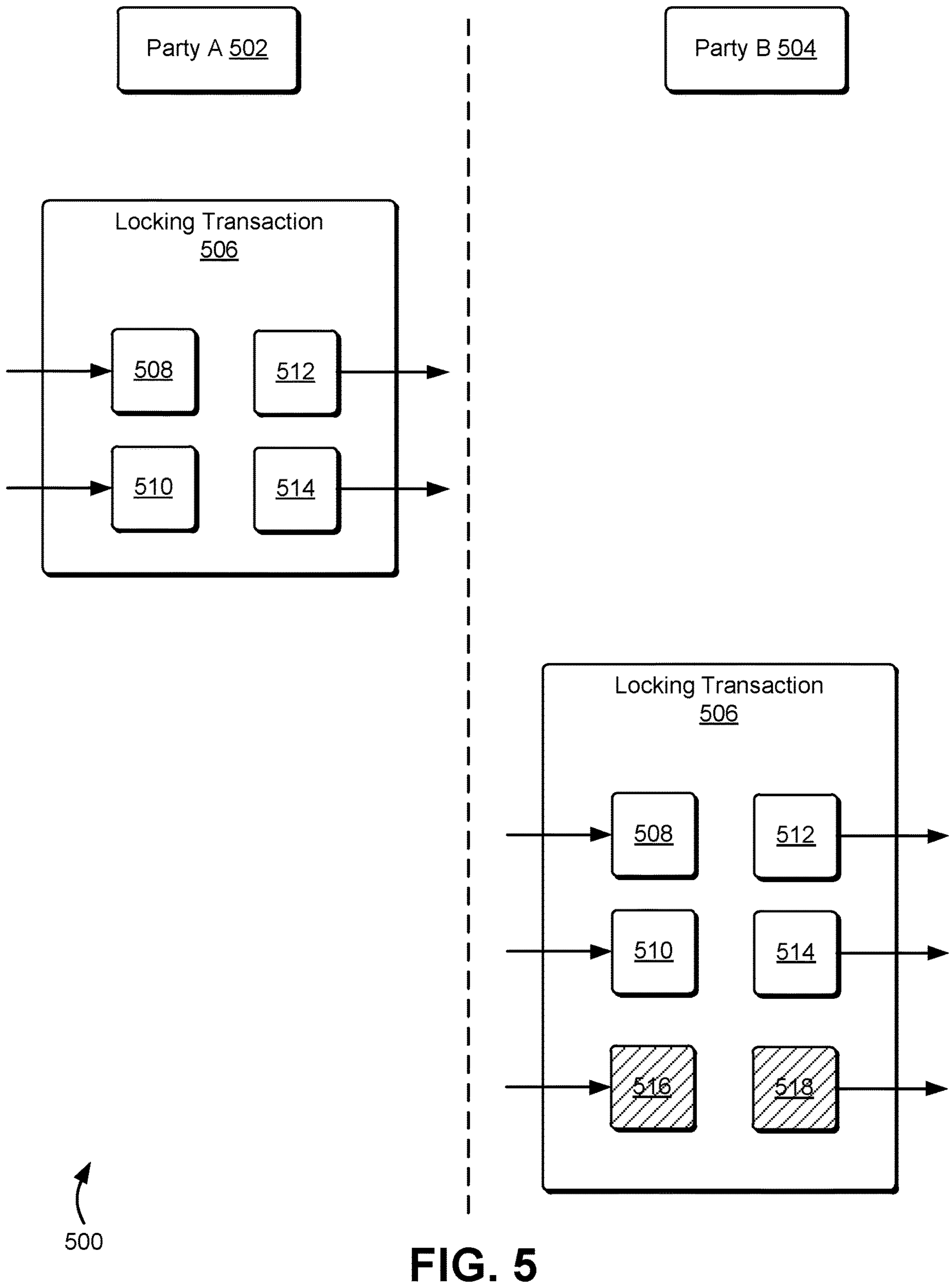
FIG. 5 illustrates a diagram of a locking transaction in accordance with various embodiments described in the present disclosure.

FIG. 5 illustrates a diagram 500 of a locking transaction in accordance with various embodiments described in the present disclosure. In an embodiment, a first party 502 and a second party 504 agree upon conditions for a contract in any suitable manner. For example, the parties may agree to a set of contractual terms offline (e.g., face-to-face negotiation between representatives of the parties, negotiations over the phone, email, or any other suitable communication medium). In an embodiment, the contractual terms are agreed upon programmatically—for example, a computer system is configured with parameters to evaluate an offer for a contract (e.g., a fulfilment price) and determine whether to accept the offer or not. As an example, a first party and a second party agree for the first party to sell and issue to the second party a token for a cost for a price that the second party agrees to pay for. In an embodiment, the token can be redeemed for physical assets (e.g., consumer goods and service), digital assets, and any combination thereof.

In an embodiment, the first party creates a locking transaction 506 comprising two inputs (e.g., inputs 508 and 510) and two outputs (e.g., outputs 512 and 514) and signs them with an indication as to how the signature should be verified (e.g., using OP_CHECKSIG). In an embodiment, the indication includes an indication of a mode of operation and a modifier indicating who can pay (e.g., anyone can pay). In an embodiment, the inputs and outputs are signed with SIGHASH_SINGLE and SIGHASH_ANYONECANPAY. In an embodiment, the inputs include a transaction amount of a nominal value (e.g., a few satoshis) and the outputs include a transaction amount that includes digital assets for a worker (the value of which may be selected based on various factors such as the value of the contract) and the value of the contract (e.g., the amount that the second party 504 agrees to pay the first party 502 as per the contact terms).

Generally speaking, the mode of operation may provide an indication of which and/or how various fields of a locking transaction are signed. For example, a first mode of operation (e.g., SIGHASH_ALL) wherein all signable parameters are signed. In an embodiment, this includes all fields of a transaction except the input scripts. A second example of a mode of operation that may be supported is a mode of operation where the outputs are not signed (e.g., SIGHASH_NONE)—accordingly, other entities are able to modify the transaction by changing their input sequence numbers. Yet another example of a mode of operation that may be supported is a mode in which the inputs are signed, but the sequence numbers are blanked (e.g., SIGHASH_SINGLE). In an embodiment, some or all modes of operation are supported. Furthermore, in addition to the modes of operation, a separate indication (e.g., SIGHASH_ANYONECANPAY) may be made as to only a single output (or, more generally, any subset of outputs) being signed and the other outputs being anything.

Next, the locking transaction 506 is provided to the second party 504. The locking transaction is received by the second party who verifies that the locking transaction is correct. In this context, correctness of the locking transaction refers to the locking transaction accurately reflecting the prior agreement between the parties and the verification of correctness includes, for example, verifying the price encoded in the token is the agreed-upon cost between the parties and the terms of the contract are in the form previously agreed upon. In an embodiment, determining correctness of the locking transaction includes verifying the authenticity of a digital signature.

Upon determining that the locking transaction is correct, the second party 504 adds a new input 516 which can include digital assets (e.g., payment agreed upon as part of the terms of the agreement between the parties) and digital assets for workers to pay for the execution of the contract. The second party 504 may also add an output 518 that constrains the common reference string and signs with SIGHASH_SINGLE or SIGHASH_ALL and broadcasts it (e.g., to a blockchain network). Once the locking transaction is broadcast, the first party 502 may be considered the owner of the contract. In an embodiment, the keys (e.g., the verification key $V_K$ and evaluation key $E_K$ included as part of the CRS) are generated using a field F where F: $\mathbb{F} \rightarrow \mathbb{F}$ is a function on a field and a corresponding arithmetic circuit $\mathcal{C}$ where $\mathcal{Q}=(t(x), \mathcal{V}, \mathcal{W}, \mathcal{Y})$ is the corresponding quadratic arithmetic program (e.g., a QAP) of size m and degree d. Additionally, in an embodiment, e: $\mathbb{G} \times \mathbb{G} \rightarrow \mathbb{G}_T$ is a bilinear mapping and g is a generator of $\mathbb{G}$. It should be noted that while the representation described in this context is an additive representation chosen for the sake of clarity, other representations (e.g., exponential representation) may be utilized in the context of embodiments in accordance with this disclosure.

In an embodiment, the evaluation key $E_K$ and verification key $V_K$ are constructed by choosing random or pseudo-random values $r_v$, $r_w$, $\alpha_v$, $\alpha_w$, $\alpha_y$, $\beta$, $\gamma \in \mathbb{F}$, and setting $r_y = r_y \cdot r_w$, $r_v \cdot g = \mathbb{G} g_v \rangle$. In other words: (a)=a g generally. Accordingly, the evaluation key $E_K$ is defined as:

$$E_K(\{\mathbb{G} v_k(s)\rangle\}_{k \in I_{mid}}, \{\mathbb{G} w_k(s)\rangle\}_{k \in I_{mid}}, \{\mathbb{G} y_k(s)\rangle\}_{k \in I_{mid}}, \{\mathbb{G} \alpha_v v_k(s)\rangle\}_{k \in I_{mid}}, \{\mathbb{G} \alpha_w w_k(s)\rangle\}_{k \in I_{mid}}, \{\mathbb{G} \alpha_y y_k(s)\rangle\}_{k \in I_{mid}}, \{\mathbb{G} s^i\rangle\}_{i \in [d]}, \{\mathbb{G} \beta v_k(s)\rangle \mathbb{G} \beta w_k(s)\rangle \mathbb{G} \beta y_k(s)\rangle\}_{k \in I_{mid}})$$

and the verification key $V_K$ is defined as:

$$V_K = (\mathbb{G} 1\rangle, \mathbb{G} \alpha_v\rangle, \mathbb{G} \alpha_w\rangle, \mathbb{G} \alpha_y\rangle, \mathbb{G} \gamma\rangle, \mathbb{G} \beta\gamma\rangle, \mathbb{G} t(s)\rangle, \{\mathbb{G} v_k(s)\rangle \mathbb{G} w_k(s)\rangle \mathbb{G} y_k(s)\rangle\}_{k \in \{0\} \cup [N]})$$

where $N = N_{in} + N_{out}$, i.e., the number of inputs and outputs. In an embodiment, an asymmetric pairing having a pairing mapping would be defined as: e: $\mathbb{G}_1 \times \mathbb{G}_2 \rightarrow \mathbb{G}_T$, and $g_i$ a generator of $\mathbb{G}_i$, i=1, 2. In that case, $V_K$ would be defined as:

$$V_K = (\mathbb{G} 1\rangle_1, \mathbb{G} 1\rangle_2, \mathbb{G} \alpha_v\rangle_2, \mathbb{G} \alpha_w\rangle_2, \mathbb{G} \alpha_w\rangle_1, \mathbb{G} \alpha_y\rangle_2, \mathbb{G} \beta\rangle_1, \mathbb{G} \beta\rangle_2, \mathbb{G} r_y t(s)\rangle_1, \{\mathbb{G} v_k(s)\rangle_1 \mathbb{G} w_k(s)\rangle_2 \mathbb{G} y_k(s)\rangle_1\}_{k \in \{0\} \cup [N]})$$

where $r_y = r_v \cdot r_w$.

As described above, the evaluation key $E_K$ and verification key $V_K$ are made up of group elements. It should be noted that any group of sufficiently high cardinality is suitable, although for purposes of clarity, the group discussed herein is an elliptic curve.

In an embodiment, an elliptic curve-based implementation of a pairing function exists. In an embodiment, the cryptography of a blockchain network is based on an elliptic curve such as a secp256k1 elliptic curve. It is possible, in some embodiments, to determine and/or estimate the amount of space that is needed to allocate keys on the blockchain. As discussed above, a subset of the elements of the verification key $V_K$ do not pertain to the size of the circuit and the space required for such fields does not depend on the size of the circuit.

In some cases, the maximum size of a standard blockchain transaction corresponds to the maximum size of a block. Various blockchain systems may have various upper limits, such as in a Bitcoin-based system wherein a standard transaction has a defined maximum block size of 1 MB and a maximum standard transaction size of 100 KB. In some blockchain systems such as a Bitcoin-based system a redeem script is 520 bytes or less in size. The maximum size of the redeem script, in an embodiment, is the largest whole chunk of data that can be pushed on the stack while still conforming to the conditions of a standard transaction. The upper bound on the unlocking input script and the locking script (e.g., P2PK, P2PH, and more), in an embodiment, is 1650 bytes. In an embodiment, this is equivalent to the script storing or otherwise encoding 15 public keys. In an embodiment, an unlocking script is referred to as an input script or a signature script (e.g., ScriptSig) and comprises a collection of data parameters which satisfy conditions placed in the previous locking script which may be referred to as an output script or scriptPubKey.

Accordingly, in an embodiment, the redeem script and the corresponding input script are arranged in such a manner that the largest amount of data possible is attached, the arrangement of the redeem script, the corresponding input script, and/or other data based at least in part on the maximum size. In an embodiment, an unlocking script comprises or otherwise encodes a digital signature. In an embodiment, FIG. 4 illustrates a structure of the largest possible unlocking and locking script that includes a signature in accordance with a standard type transaction of a Bitcoin-based system. It should be noted that in an embodiment, the structure illustrated in FIG. 4 is utilized so as to attach the largest amount of data possible within the constraints of a blockchain system (e.g., the maximum size of a standard transaction), but in other embodiments, the structure is defined in any other suitable manner, such as structures that allow less than the maximum amount of data to be attached.

In an embodiment, data is recorded in non-standard transaction either in addition to and/or in place of standard transactions. The hardcoded script length, in an embodiment, is 10 kilobytes (KB) and a set of mining nodes of a blockchain accept transactions for smart transactions that are otherwise deemed non-standard. In other words, some embodiments utilize non-standard transactions that are identifiable as smart transactions, and one or more nodes of a blockchain network accept such transactions.

Figure 6:
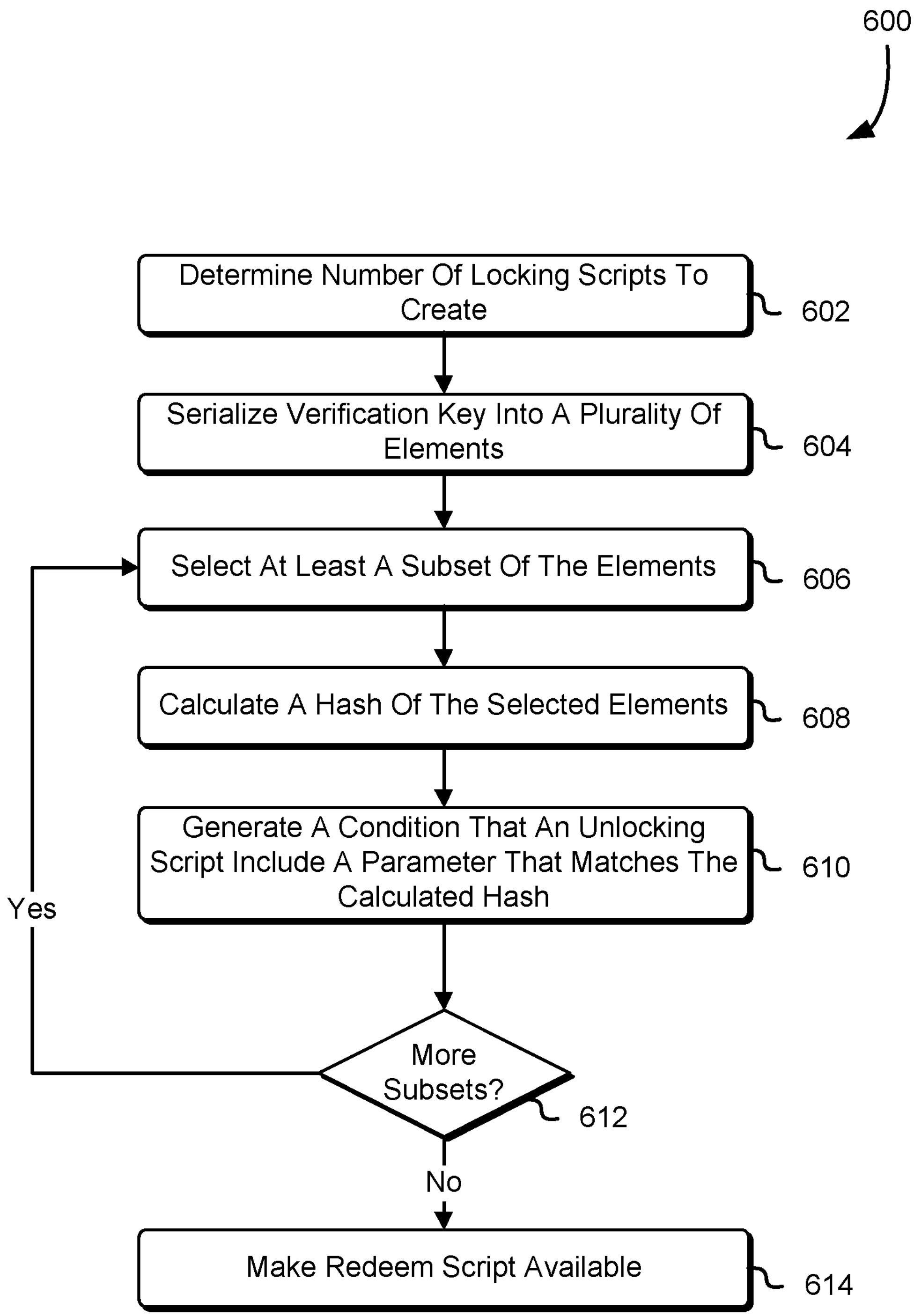
FIG. 6 illustrates a process for generating a redeem script in accordance with at least one embodiment.

FIG. 6 illustrates a flowchart describing a process 600 for generating a redeem script in accordance with at least one embodiment. The process 600 may be performed by any suitable computer system, such as a client as described elsewhere in this disclosure, such as in connection with FIG. 3. In an embodiment, the redeem script is generated in the context of other embodiments, such as those described in connection with FIG. 4. Based on a circuit, C, and a secret, s, a client determines a common reference string CRS comprising a verification key $V_K$ by performing the process 600. In an embodiment, the process is in accordance with a protocol that relies on various subroutines that perform various functions. For example, a no_TX(ARG) function is used to measure the size of the argument ARG in bytes or in any suitable unit of measurement that, in an embodiment, has a conversion to bytes (e.g., bits). In an embodiment, the function is used to determine 602 the number of locking scripts to create. In an embodiment, the no_TX(ARG) function measures the byte size of the ARG input parameter and returns 1 if the amount of data can be stored in a standard script, else if ARG exceeds the size of the maximum for a script in a standard transaction, it returns the number of transactions necessary output (scripts) needed to accommodate the amount of data corresponding to the input of the function, ARG. In an embodiment, the function simply returns an indication of whether an amount of data corresponding to the input ARG exceeds the size of the maximum for a script in a standard transaction, such as a TRUE or FALSE Boolean indication or any equivalent thereof (e.g., an integer value of 0 equivalent to a FALSE indication and a non-zero value equivalent to a TRUE indication). In an embodiment, supplying the no_TX( ) subroutine (e.g., as described above) with the verification key $V_K$ as the input provides information usable to determine how many locking transactions to create. The value of byte length $$(V_K^i)$$

may be referred to as the size of the compressed keys. For example, the verification key $V_K$ may be split into a plurality of 32-bit sub-sequences.

$$V_K^i$$

may be a specific representation of the <k>—for example, $$V_K^i$$

can be the hexadecimal equivalent of <k>.

The system serializes 604 the verification key into a plurality of elements in accordance with an embodiment. Generally speaking, serializing data refers to dividing the data into smaller chunks, such as according to a length that has been set by some standard or protocol. For example, the verification key $V_K$ may be split into 32-bit chunks, i.e., $$V_K^1 \| V_K^2 \| \ldots \| V_K^N = VK.$$

In an embodiment, the chunk size is selected based at least in part on the size of a key such as a compressed key. In an embodiment, the serialize(ARG) function divides the ARG input into smaller data sequences according to a length that is set by a standard or protocol—for example, in an embodiment, serialize(ARG) serializes a sequence of data into contiguous 32-byte sub-sequences, although in other embodiments the sub-sequences can be of different fixed/variable length as defined by any suitable protocol.

Generally speaking, the system selects 606 at least a subset of the elements of the verification key. In an embodiment, the subset is a contiguous subset (e.g., such as those described in examples above) that have a total size that does not exceed a threshold size (e.g., the 520 byte limit on stack objects of a Bitcoin-based system). In an embodiment, the subset is determined by sequentially selecting as many verification key $V_K$ elements that fit within the prescribed size limits.

In an embodiment, the system, for each locking transaction, allocates a set of keys to be included in corresponding unlocking script following a set of rules. In an embodiment, a protocol has an upper limit to the size of data objects that may be pushed onto the stack—for example, in Bitcoin, 520 bytes is the maximum size allowable for a block. Accordingly, if the verification key $V_K$ is less than or equal to 520 bytes in size (i.e., if the system determines that the verification key can be encoded without being split into multiple subsets). In an embodiment, the system calculates 608 a hash over the selected elements, which, as described above, may be the entire verification key $V_K$. In an embodiment, an opcode such as OP_HASH160 is utilized to hash the subset. In an embodiment, the hashing of the object utilizes multiple cryptographic hash algorithms, such as SHA-256 and RIPEMD-160 to generate a hash output HVK and encoded in a redeem script such as the following redeem script:

OP_HASH160<HVK> OP_EQUALVERIFY<PubKey worker> OP_CHECKSIG

Of course, other hash algorithms and corresponding hashing opcodes may be utilized in various embodiments. The redeem script, when executed in connection with an unlocking script that provides an attestation that the worker possesses the verification key $V_K$, is usable to unlock digital assets encumbered by a corresponding locking script. Accordingly, a redeem script is generated 610 with one or more conditions that a corresponding unlocking script include one or more parameters that match based at least in part on the calculated hash. In an embodiment, the redeem script further comprises a condition that the output script include a digital signature generated using a worker's private key that corresponds to a public key encoded in the redeem script.

In an embodiment, the system determines that the verification key $V_K$ exceeds the maximum allowable size for data blocks on the stack and splits the verification key $V_K$ into two or more subsets. In an embodiment, the system determines the number of chunks to include in each subset, such as by calculating the maximum number of chunks that can be encoded within the size limits of the protocol. In an embodiment, the system encodes each subset with the maximum number of chunks or the number of remaining chunks that have not been encoded. For example, in a Bitcoin-based system wherein each chunk $$V_K^i$$

is 32 bytes and $$VK = V_K^1 \| V_K^2 \| \ldots \| V_K^N \text{ for } 16 < N \le 32,$$

the verification key $V_K$ is partitioned into at least two subsets, such as a first subset $$VK1 = V_K^1 \| V_K^2 \| \ldots \| V_K^{16}$$

and a second subset $$VK2 = V_K^{17} \| V_K^{18} \| \ldots \| V_K^N.$$

It should be noted that in this example, VK1 includes the maximum number of chunks permissible within a Bitcoin-based system's maximum stack data block size (i.e., 16×32=512 bytes, which is the maximum number of chunks permissible within the maximum size of 520 bytes as the largest whole chunk of data that can be pushed on the stack). In an embodiment, the subsets VK1, VK2, etc. are each provided as an input to a cryptographic hash algorithm to generate a hash output and the hash output is encoded as a condition of the redeem script wherein a valid unlocking script supplies the verification key $V_K$ or a portion thereof. As an example, in the example where $$VK1 = V_K^1 \| \ldots \| V_K^{16}$$

and a second subset $$VK2 = V_K^{17} \| \ldots \| V_K^N \text{ for } 16 < N \leq 32,$$

a suitable redeem script may be described as:

OP_HASH160<HVK2> OP_EQUALVERIFY OP_HASH160<HVK1> OP_EQUALVERIFY<PubKey worker> OP_CHECKSIG wherein $$< HVK1 >= \text{HASH160}(V_K^1 \| \ldots \| V_K^{16}) \text{ and}$$

$$< HVK2 >= \text{HASH160}(V_K^{17} \| \ldots \| V_K^N).$$

In an embodiment, the system generates a first hash <HVK1> and determines that a second hash <HVK2> is to be generated from the second subset VK2 of verification key elements.

As a third example, consider an embodiment described in connection with FIG. 4 wherein the maximum size of the unlocking script is 1650 bytes and the maximum size of a block of data is 520 bytes. The system maximizes the size of the verification key $$V_k = V_K^1 \| V_K^2 \ldots \| V_K^{45},$$

and selects a first subset $$VK1 = V_K^1 \| \ldots \| V_K^{16},$$

a second subset $$VK2 = V_K^{17} \| \ldots \| V_K^{32},$$

and a third subset $$VK3 = V_K^{33} \| \ldots \| V_K^{45}.$$

Corresponding hashes <HVK1>, <HVK2>, and <HVK3> are computed and conditions that the locking script include parameters that match the calculated hashes are generated, such as in the following manner:

OP_HASH160<HVK3> OP_EQUALVERIFY OP_HASH160<HVK2> OP_EQUALVERIFY OP_HASH160<HVK1> OP_EQUALVERIFY <PubKey worker> OP_CHECKSIG Each time a hash is generated, the system may determine whether 612 additional subsets should be identified and hashed. In an embodiment, the system determines that no additional subsets are needed based on making a determination that each element of the verification key V has a corresponding condition in the redeem script that is satisfied based on a worker supplying the respective element as part of the unlocking script. In an embodiment, the systems makes available 614 the redeem script, such as to the worker, who is able to use the redeem script to generate the corresponding unlocking script.

In order to redeem the payment to a worker (e.g., the entity associated with <PubKey worker>), the worker, in an embodiment, demonstrates possession of the correct verification key $V_K$. In an embodiment, any suitable attestation of possession of the correct verification key $V_K$ is usable by the system wherein a counterparty is able to cryptographically verify the worker's attestation of a purported possession. In an embodiment, a worker will, for each locking script, create an unlocking script which, like in the case of the creation of the redeem script, will differ depending on the length of the serialized verification key $V_K$.

If the length of the serialized verification key $V_K$ is of sufficiently small cardinality (e.g., $V_K$ is small enough that the entire verification key can be pushed onto the stack without partitioning), the worker creates the unlocking script:

OP_PUSHDATA1<length of signature><signature> OP_PUSHDATA1<byte-length of VK> VK OP_PUSHDATA1<length of redeem script><redeem script>

Otherwise, if the length of the serialized verification key exceeds the applicable threshold, then the worker splits $V_K$ into two or more subsets. For example, in the case of a Bitcoin-based protocol where $$V_K = V_K^1 \| \ldots \| V_K^{32} \text{ and } V_K^i \text{ is 32 bytes,}$$

$$VK1 = V_K^1 \| \ldots \| V_K^{16} \text{ and } VK2 = V_K^{17} \| \ldots \| V_K^{32},$$

and creates the unlocking script:

OP_PUSHDATA1<length of signature><signature> OP_PUSHDATA1<byte-length of VK1> VK1 OP_PUSHDATA1<byte-length of VK2> VK2 OP_PUSHDATA1<length of redeem script><redeem script>

As a third example, consider an embodiment described in connection with FIG. 4 wherein the maximum size of the unlocking script is 1650 bytes and the maximum size of a block of data is 520 bytes. The worker splits $V_K$ into three subsets $$VK1 = V_K^1 \| \ldots \| V_K^{16},\ VK2 = V_K^{17} \| \ldots \| V_K^{32}, \text{ and } VK3 = V_K^{33} \| \ldots \| V_K^{n \le 45},$$

and creates the unlocking script:

OP_PUSHDATA1<length of signature><signature>
OP_PUSHDATA1<byte-length of VK1> VK1
OP_PUSHDATA1<byte-length of VK2> VK2
OP_PUSHDATA1<byte-length of VK3> VK3
OP_PUSHDATA1<length of redeem script><redeem script>

Various extensions to embodiments as described in this disclosure are contemplated in addition to those explicitly discussed. In an embodiment, a protocol such as a Bitcoin-based protocol is used to implement systems and methods described herein in some cases, existing protocols may be extended so as to support additional functionality.

For example, in an embodiment, the output is separated into a plurality of transfers—for example, the output is split into two parts, one for elements belonging to a first group G1 and the other for a second group G2. Accordingly, in this example, there are two inputs paying (with hexadecimal representation of the group elements from each group included in the script) to the public key of the worker. The steps in this protocol for symmetric pairing are repeated for each of the two inputs. In an embodiment, a protocol would be extended to piece together the verification key accordingly.

As a second example, the key (e.g., in the order of elements stemming from groups G1 and G2, respectively) is kept as it is and a protocol (e.g., an existing Bitcoin-based protocol) is extended to encode and decode the keys and segregate which 32-byte representation of a group element belongs with which group, for example, through the use of a hash map or any other suitable data structure. In an embodiment, software running on top of an existing protocol (e.g., an extension to the protocol used by at least a subset of the set of nodes of a blockchain network) is used to encode and decode the keys and segregate which 32-byte hexadecimal representation of a group element belongs to which group.

Figure 7:
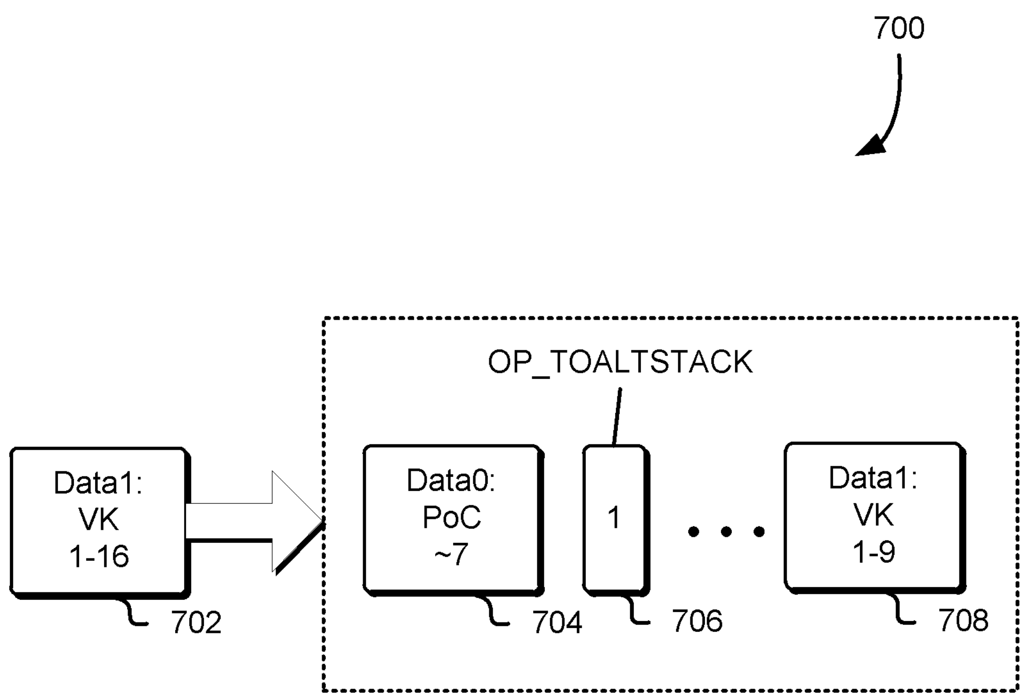
FIG. 7 illustrates a diagram in which a protocol is modified to include a proof of calculation when unlocking digital assets based on the execution of a smart contract.

In an embodiment, FIG. 7 illustrates a diagram 700 of an embodiment in which a protocol is modified to include a proof of calculation 704 when redeeming the digital assets for executing the contract. For example, a Bitcoin-based protocol is extended to support including the proof of calculation when redeeming the digital assets for executing the contract. In an embodiment, the proof of calculation comprises a fixed number of elements and has fixed-length properties. FIG. 7 illustrates one such example of how to record the proof of calculation on the blockchain in which a first data block 702 (e.g., the first data block Datal) is split such that the first data block 702 includes the elements corresponding to the proof of calculation 704, which are pushed to an alt stack (e.g., using a command such as OP_TOALTSTACK 706) so as to make space for a signature check against the corresponding public key. In an embodiment, the first batch of elements corresponding to the verification key are in the block labelled 'Datal' 708. It should be noted that the annotation of the data block sizes is purely illustrative.

Additional enhancements are contemplated within the scope of this disclosure. As discussed elsewhere, a protocol such as those described herein can be enhanced with additional support that reads off the hashed values of the verified key (e.g., HASH160($V_K$)) and the verification key $V_K$ itself and publishes the two in association with the transaction identifiers of the locking and workers redeeming transactions, respectively. Accordingly, in this way, an entity that later verifies the proof of correctness published by the worker can do so with assurances that the key is the one published by the client initially.

In an embodiment, a protocol as described herein (e.g., a Bitcoin-based protocol) is extended with an additional opcode, command, or statement that performs a check on the proof of correctness (e.g., in the manner described above). In an embodiment, an OP_CHECKPOC opcode is supported and operates on the proof of correctness, verification key, input (u), and output(y) in a manner similar to how OP_CHECKSIG checks that the signature for a transaction input is valid. In an embodiment, OP_CHECKPOC returns a TRUE or FALSE value, a 1 or 0 value, etc. indicating whether the proof of correctness was verified.

FIG. 8 is an illustrative, simplified block diagram of a computing device 800 that can be used to practice at least one embodiment of the present disclosure. In various embodiments, the computing device 800 can be used to implement any of the systems illustrated and described above. For example, the computing device 800 can be configured for use as a data server, a web server, a portable computing device, a personal computer, or any electronic computing device. As shown in FIG. 8, the computing device 800 could include one or more processors 802 that, in embodiments, communicate with and are operatively coupled to a number of peripheral subsystems via a bus subsystem 804. In some embodiments, these peripheral subsystems include a storage subsystem 806 comprising a memory subsystem 808 and a file/disk storage subsystem 810, one or more user interface input devices 812, one or more user interface output devices 814, and a network interface subsystem 816. Such storage subsystem 806 could be used for temporary or long-term storage of information.

In some embodiments, the bus subsystem 804 provides a mechanism for enabling the various components and subsystems of computing device 800 to communicate with each other as intended. Although the bus subsystem 804 is shown schematically as a single bus, alternative embodiments of the bus subsystem utilize multiple busses. In some embodiments, the network interface subsystem 816 provides an interface to other computing devices and networks. The network interface subsystem 816, in some embodiments, serves as an interface for receiving data from and transmitting data to other systems from the computing device 800. In some embodiments, the bus subsystem 804 is utilised for communicating data such as details, search terms, and so on.

In some embodiments, the user interface input devices 812 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 800. In some embodiments, the one or more user interface output devices 814 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 800. The one or more user interface output devices 814 can be used, for example, to present user interfaces to facilitate user interaction with applications performing processes described and variations therein, when such interaction may be appropriate.

In some embodiments, the storage subsystem 806 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 806. These application modules or instructions can be executed by the one or more processors 802. In various embodiments, the storage subsystem 806 additionally provides a repository for storing data used in accordance with the present disclosure. In some embodiments, the storage subsystem 806 comprises a memory subsystem 808 and a file/disk storage subsystem 810.

In embodiments, the memory subsystem 808 includes a number of memories, such as a main random access memory (RAM) 818 for storage of instructions and data during program execution and/or a read only memory (ROM) 820, in which fixed instructions can be stored. In some embodiments, the file/disk storage subsystem 810 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 800 includes at least one local clock 824. The local clock 824, in some embodiments, is a counter that represents the number of ticks that have transpired from a particular starting date and, in some embodiments, is located integrally within the computing device 800. In various embodiments, the local clock 824 is used to synchronize data transfers in the processors for the computing device 800 and the subsystems included therein at specific clock pulses and can be used to coordinate synchronous operations between the computing device 800 and other systems in a data centre. In another embodiment, the local clock is a programmable interval timer.

The computing device 800 could be of any of a variety of types, including a portable computer device, tablet computer, a workstation, or any other device described below. Additionally, the computing device 800 can include another device that, in some embodiments, can be connected to the computing device 800 through one or more ports (e.g., USB, a headphone jack, Lightning connector, etc.). In embodiments, such a device includes a port that accepts a fibre-optic connector. Accordingly, in some embodiments, this device is that converts optical signals to electrical signals that are transmitted through the port connecting the device to the computing device 800 for processing. Due to the ever-changing nature of computers and networks, the description of the computing device 800 depicted in FIG. 8 is intended only as a specific example for purposes of illustrating the preferred embodiment of the device. Many other configurations having more or fewer components than the system depicted in FIG. 8 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

All references, including publications, patent applications, and patents, cited herein are hereby incorporated by reference to the same extent as if each reference were individually and specifically indicated to be incorporated by reference and were set forth in its entirety herein.

The invention claimed is:

1. A computer-implemented method, comprising:

obtaining a first script associated with a blockchain transaction, the first script comprising:

a first set of commands;

two or more cryptographic hash values corresponding to respective non-overlapping two or more subsets of a plurality of elements, wherein the plurality of elements collectively form a verification key; and a public key corresponding to a private key;

generating a second script comprising:

a second set of commands;

the two or more subsets of the plurality of elements the first script; and a signature based on the private key of a worker computer system generating the second script; and generating an attestation that the worker computer system has access to the verification key based at least in part on the public key of the worker computer system, the signature, and executing the first set of commands and the second set of commands in connection to determine that the two or more cryptographic hash values match the two or more subsets of the verification key;

wherein the two or more cryptographic hash values in the first script are arranged in an order that is a reverse of an order in which corresponding non-overlapping subsets of the verification key are provided in the second script, such that each subset hashed in the second script is compared, in reverse order, to a corresponding hash value in the first script;

wherein the executing comprises, for each subset, computing a hash output using a predetermined multi-stage cryptographic hash function and determining whether the computed hash output matches a corresponding one of the two or more cryptographic hash values in the first script;

wherein the signature is a digital signature generated using the private key corresponding to the public key in the first script, and the attestation is generated responsive to both verification of the digital signature using the public key and successful matches for all subsets; and wherein the attestation enables a verifier node of the blockchain to validate a proof-of-correctness of an outsourced computation using the verification key and the attestation without recomputing the outsourced computation.

2. The computer-implemented method according to claim 1, wherein an element of the plurality of elements is a point on an elliptic curve.

3. The computer-implemented method according to claim 1, wherein the hash output is generated using at least a SHA-256 and a RIPEMD-160 cryptographic hash algorithm.

4. The computer-implemented method according to claim 1, wherein obtaining the first script comprises:

identifying the two or more subsets of the verification key; and calculating, for each subset of the two or more subsets of the verification key, a corresponding cryptographic hash value, wherein the two or more cryptographic hash values comprises each corresponding cryptographic hash value.

5. The computer-implemented method according to claim 1, further comprising, as a result of verifying the generated attestation, transferring control of digital assets encumbered by the blockchain transaction to the computer system.

6. The computer-implemented method according to claim 5, further comprising obtaining the first script from a second computer system, wherein the second computer system contributed at least part of the digital assets.

7. The computer-implemented method according to claim 1, wherein the blockchain transaction is a P2SH transaction.

8. The computer-implemented method according to claim 1, wherein at least one of the two or more subsets of the verification key is greater or equal to 512 bytes in size and less than or equal to 520 bytes in size.

9. The computer-implemented method according to claim 1, wherein:

the first script is greater than or equal to 58 bytes in size and less than or equal to 104 bytes in size; and the second script is greater than or equal to 1628 bytes in size and less than or equal to 1650 bytes in size.

10. The computer-implemented method according to claim 1, wherein the blockchain transaction is a standard transaction in accordance with a blockchain protocol.

11. The computer-implemented method according to claim 1, wherein each element of the verification key is in exactly one of the two or more subsets.

12. A system, comprising:

a processor; and memory including executable instructions that, as a result of being executed by the processor, causes the system to perform the computer-implemented method according to claim 1.

13. A non-transitory computer-readable storage medium having stored thereon executable instructions that, as a result of being executed by a processor of a computer system, cause the computer system to at least perform the computer-implemented method according to claim 1.

14. A system, comprising:

a processor; and memory including executable instructions that, as a result of being executed by the processor, causes the system to perform the computer-implemented method according to claim 2.

15. A non-transitory computer-readable storage medium having stored thereon executable instructions that, as a result of being executed by a processor of a computer system, cause the computer system to at least perform the computer-implemented method according to claim 2.

* * * * *